(12) United States Patent
Dunham

(10) Patent No.: US 10,428,469 B2
(45) Date of Patent: Oct. 1, 2019

(54) SYSTEM AND METHOD FOR MAGNETIC LEVITATION AND ACCELERATION SUPPORT SYSTEM

(71) Applicant: Mark London Dunham, Modesto, CA (US)

(72) Inventor: Mark London Dunham, Modesto, CA (US)

(*) Notice: Subject to any disclaimer, the term of this patent is extended or adjusted under 35 U.S.C. 154(b) by 247 days.

(21) Appl. No.: 15/630,921

(22) Filed: Jun. 22, 2017

(65) Prior Publication Data
US 2018/0223481 A1    Aug. 9, 2018

Related U.S. Application Data

(60) Provisional application No. 62/457,157, filed on Feb. 9, 2017.

(51) Int. Cl.
| | | |
|---|---|---|
| *E01B 25/30* | (2006.01) | |
| *H01F 7/02* | (2006.01) | |
| *B61B 13/08* | (2006.01) | |
| *B60L 13/06* | (2006.01) | |
| *B60L 13/04* | (2006.01) | |

(52) U.S. Cl.
CPC ............ *E01B 25/305* (2013.01); *B60L 13/04* (2013.01); *B60L 13/06* (2013.01); *B61B 13/08* (2013.01); *H01F 7/0236* (2013.01); *H01F 7/0247* (2013.01); *B60L 2200/26* (2013.01)

(58) Field of Classification Search
CPC .......... E01B 25/00; E01B 25/08; E01B 25/30; E01B 25/305; E01B 25/32; B60L 13/00; B60L 13/04; B60L 13/06; B60L 13/08
See application file for complete search history.

(56) References Cited

U.S. PATENT DOCUMENTS

| | | | | |
|---|---|---|---|---|
| 6,357,359 | B1 * | 3/2002 | Davey | B60L 13/10 104/281 |
| 7,096,794 | B2 * | 8/2006 | Post | B60L 13/04 104/281 |
| 2003/0005851 | A1 * | 1/2003 | Post | B60L 13/04 104/281 |
| 2003/0112105 | A1 * | 6/2003 | Post | B60L 13/04 335/285 |
| 2007/0131134 | A1 * | 6/2007 | Post | B60L 13/04 104/284 |
| 2013/0174757 | A1 * | 7/2013 | Post | B60L 13/04 104/283 |

* cited by examiner

*Primary Examiner* — Robert J McCarry, Jr.
(74) *Attorney, Agent, or Firm* — Christopher Mayle; John D. Houvener; Bold IP, PLLC

(57) ABSTRACT

An improved magnetic transportation system comprised of Halbach array systems and London Assemblage systems having a plurality of magnets that are magnetically and structurally arranged to form a magnetic field of flux that attracts and repels the connections to enable loads on the xz-axis to levitate at rest, during object acceleration or deceleration, and at high-speeds, as well as on the yz-axis enable initial propulsion and for lateral stabilization on the xz/yz-axis.

19 Claims, 18 Drawing Sheets

SYSTEM AND METHOD FOR MAGNETIC LEVITATION AND ACCELERATION SUPPORT SYSTEM

CROSS-REFERENCE TO RELATED APPLICATIONS

The present application is a non-provisional application which claims the benefit of U.S. Provisional Patent Application No. 62/457,157, filed on Feb. 9, 2017, entitled "SYSTEM AND METHOD FOR MAGNETIC LEVITATION AND ACCELERATION;" which is incorporated herein by reference in its entirety as if fully set forth herein.

BACKGROUND

In present magnetic levitation (maglev) trains, superconducting magnet coils are used to produce the Vertical Stabilizer force, while Linear Synchronous Motors (LSM) and Linear Induction Motors (LIM) use complicated control circuits to maintain the gap distance of the train Vertical components to stabilize the load. Because the loads typically operate at top speeds of approximately 500 kilometers per hour, the circuitry must be highly reliable, and must operate with high precision and with a short time response.

In present maglev trains, servo-control systems are used to control load rest, momentum, and braking by using LSM and LIM. LSM and LIM use complicated control circuits to maintain the gap distance of the train above the stationary track against which the levitation forces are produced. Because the trains typically operate at top speeds of approximately 500 kilometers per hour, this circuitry must be highly reliable, and must operate with high precision and with a short time response.

In other present trains, such as the "Inductrack," which use passive technology for momentum still require conventional wheel usage during load rest and energized track coils for initial propulsion.

SUMMARY

It is an object of the present invention to provide a simple, reliable and inexpensive means for the magnetic levitation of objects.

It is an object of the present invention to provide a system where the power required to levitate a train or a load, is drawn from the Halbach arrays mounted on the bottom portions of the train or load itself, and represents all power required to overcome aerodynamic drag at initial lift and at continuous high speeds.

It is an object of the present invention to provide a system that would be exemplary for lower-speed applications of magnetic levitation, such as urban train systems where it is desirable to employ systems that are simple in construction and operation and that have low drag and low noise at urban speeds.

The present invention, also known as the Magnetic Acceleration (MagAcc) system differs in fundamental ways from present day levitation methods, which currently achieve levitation by the interaction with electromagnetic fields. The MagAcc system also replaces conventional wheel usage during load rest and momentum with the magnetic fields of force found in the improved magnetic levitation transportation system by using the magnetic fields of force emanating from the Halbach array, which is made from Neodymium permanent magnets (NdFeB).

The MagAcc system Lateral Stabilizers differ in fundamental ways from present day magnetic levitation load stabilizing methods, which currently achieve stability by the interaction with electromagnetic fields. The MagAcc system also replaces conventional wheel usage during train and load at rest and at initial momentum, acceleration and deceleration with the magnetic fields of force found in the improved MagAcc transportation system. Additionally, the MagAcc system Vertical Stabilizers differs in fundamental ways from present day Magnetic levitation load Stabilizer methods, which currently achieve stability by the interaction of magnetic fields to that of electromagnetic fields.

The Joined Undulate Right/Left/Yawing Navigation (JURLYN) servo-control system is the central command processor unit that joins the magnetic waves of Phases I-IV to form the dynamics of a stabilized mode for load rest, stabilized load increased/decreased momentum, and a stabilized method for load braking. The JURLYN sends and receives commands to and from all systems and command modules within connection to the load. All attitude adjustments, alignment corrections, load speed calculations, gyro commands at load rest and throughout load momentum are done within the confines of the JURLYN servo-control system. The JURLYN is located onboard the load and is purposed to maintain the Halbach array and London Assemblage systems onboard the load. For every magnetic field of force (MFF) encountering between the onboard Halbach arrays and the Halbach array's Track Division (TD) and onboard London Assemblages and the London Assemblages (LSL)/(LSTL) and (LSR)/(LSTR) in their respective Stabilizer Housing Unit (SHU), its measure of push and pull toward or away from the TD is controlled by the JURLYN.

It is an object of the present invention to use magnetic fields of force being produced by a first set of Halbach array or London Assemblage, each made of permanent magnets, respectively, positioning their first set to obtain a repelling action as it interacts against another magnetic field of force being produced by a second set of Halbach array or London Assemblage made of permanent magnets of equivalent symmetry in every respect to the first set of Halbach array or London Assemblage, respectively.

For the Halbach array, when such magnetic fields of force elements interact with one another, the interaction between their magnetic fields of force produce an isolated attracting force and an isolated repelling force along the same axis of their encountering Halbach arrays. The isolated repelling and isolated attracting magnetic fields of force are applied to levitate objects at rest, during object acceleration, and at high-speeds, as well as to include any load within magnetic fields lift parameters. The force required to levitate a load is embodied in the interactions between the two magnetic fields of force between the two sets of Halbach array themselves.

Object lift occurs when magnetic fields of force being produced by a first set of Halbach array made of permanent magnets are positioned to obtain an isolated repelling action along the xz-axis as it interacts against another magnetic field of forces being produced by a second set of Halbach array made of permanent magnets of equivalent symmetry in every respect to the first set of Halbach array.

Important advances result from these use of these types of Halbach array settings: First, the levitating (horizontal) component of the magnetic field is approximately triple that of a single array. This suggests that the same levitating force per unit area can be achieved with one set of arrays above another set of arrays, i.e., with minimal resistive power loss. Second, in Magnetic Acceleration, the current needed to obtain, adjust, and maintain the horizontal field component is eliminated, as well as the drag peak near the lift-off speed, because levitation is obtained at vehicle rest and throughout momentum along the track.

For the London Assemblage, when such magnetic fields of force elements interact with one another, the interaction between their magnetic fields of force produce only isolated repelling forces along the same axis of their encountering London Assemblages. The isolated repelling magnetic fields of force are applied to laterally stabilize objects at rest, during object acceleration, and at high-speeds, as well as to include any load within magnetic fields lateral stabilizing parameters. The force required to laterally stabilize a load is embodied in the interactions between the two magnetic fields of force between the two sets of London Assemblage themselves.

Object lateral stability occurs when magnetic fields of force being produced by a first set of London Assemblage made of permanent magnets are positioned to obtain an isolated repelling action along the xz-axis and yz-axis as it interacts against another magnetic field of forces being produced by a second set of London Assemblage made of permanent magnets of equivalent symmetry in every respect to the first set of London Assemblage.

Important advances result from the use of these types of London Assemblage settings: First, the lateral stabilizing component of the magnetic field permit the magnetic fields of force to exist along the xz & yz axis at the same time stamp in location. This suggests that the same force per unit area can be achieved with one set of London Assemblage above another set of London Assemblage, i.e., with minimal resistive power loss. Second, in this Magnetic Acceleration Support System, the current needed to obtain, adjust, and maintain the lateral stabilized field component is eliminated, as well as the drag peak near the lift-off speed, because lateral stability is obtained at vehicle rest and throughout momentum along the track.

BRIEF DESCRIPTION OF DRAWINGS

Some embodiments of this invention herein have been described and illustrated with reference to the embodiments of FIGS. 1-4, but it should be understood that the features and operation of the invention as described is susceptible to modification and alteration without departing significantly from the spirit of the invention. For example, the dimensions, size and shape of the various elements may be altered to fit specific applications. Accordingly, the specific embodiments illustrated and described herein are for illustrative purposes.

Although the invention is generally described in the context of these embodiments, it should be understood that it is not intended to be limited to only these embodiments. Certain elements in the drawings may be illustrated not-to-scale for illustrative clarity.

Figure 1A:
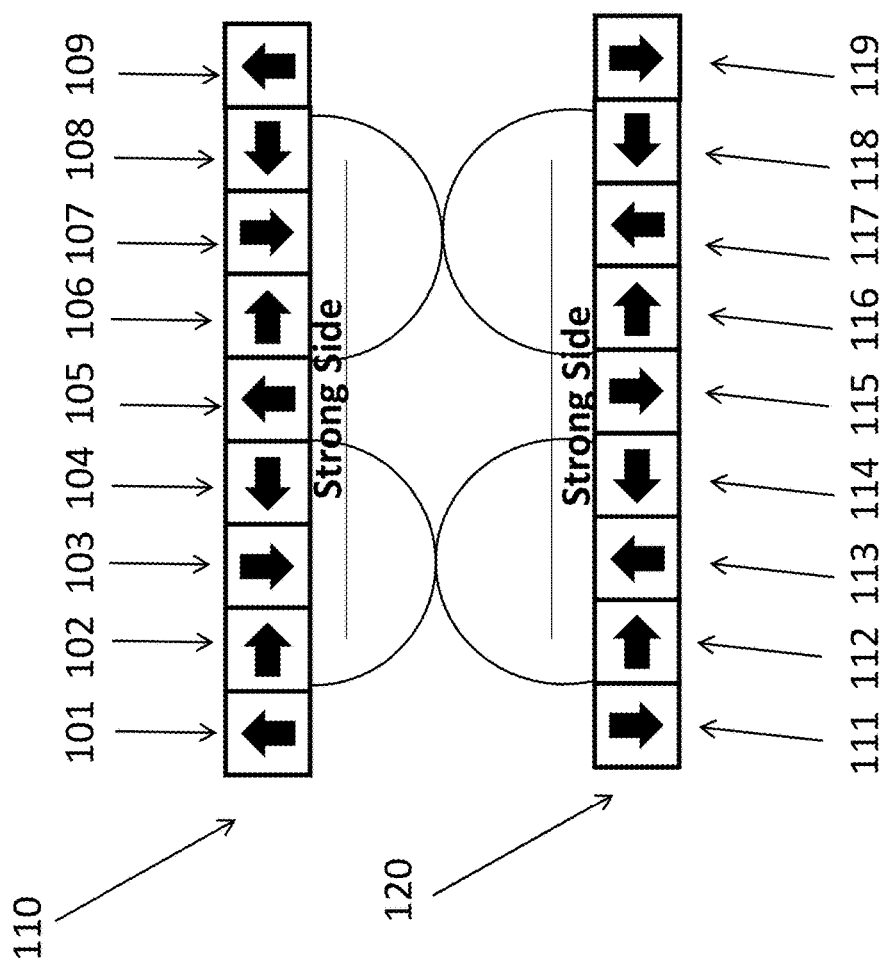

The structure, operation, and advantages of the present embodiments of the invention may become further apparent upon consideration of the following description taken in conjunction with the accompanying drawings, wherein:

FIG. 1A depicts an Upper Halbach array and a Lower Halbach array with vertical magnetic fields of force repelling, according to the present embodiment.

Figure 1B:
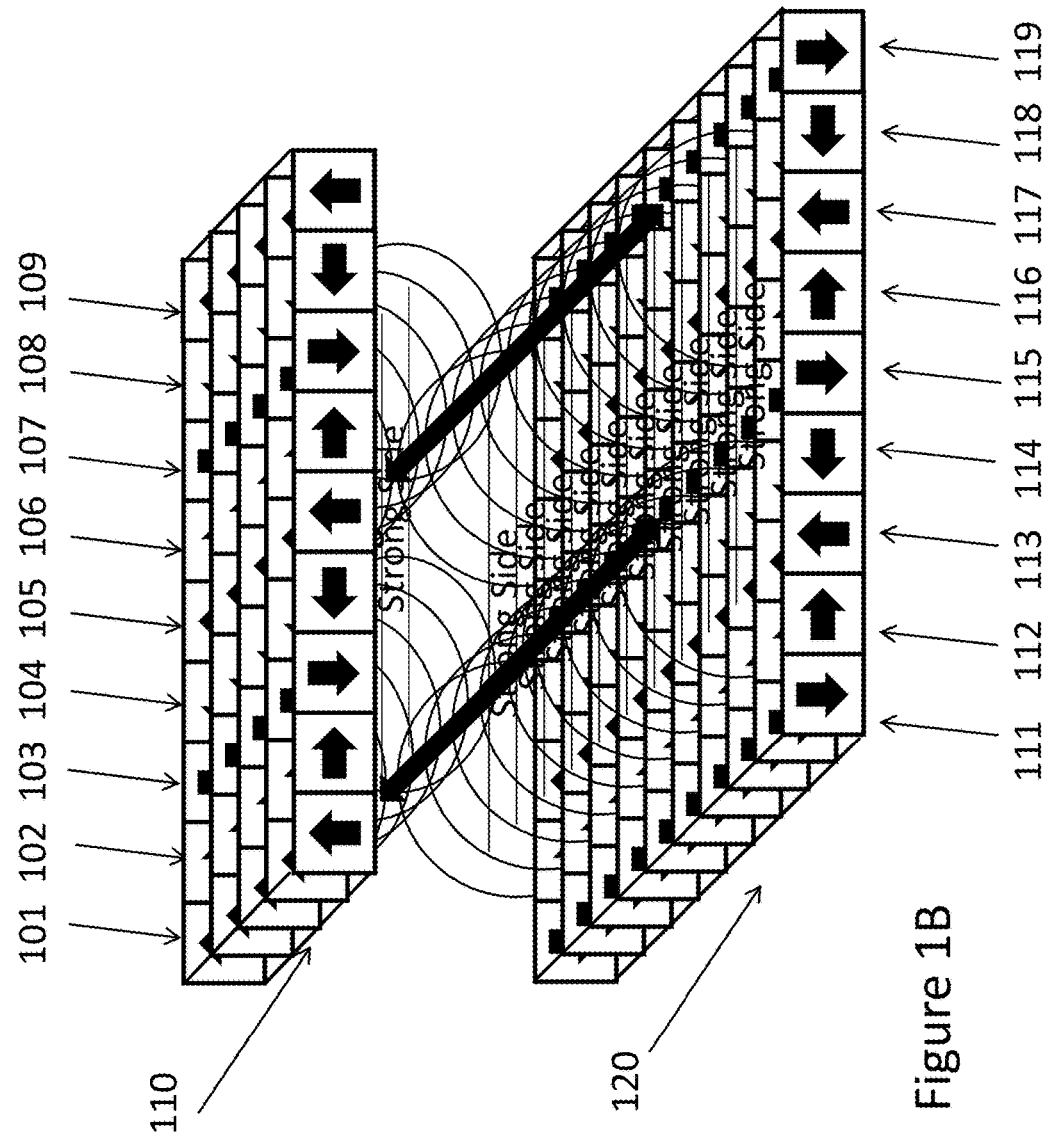

FIG. 1B depicts a series of Upper Halbach arrays and a series of Lower Track Division (LTD) Halbach arrays and an xz-axis directional.

Figure 1C:
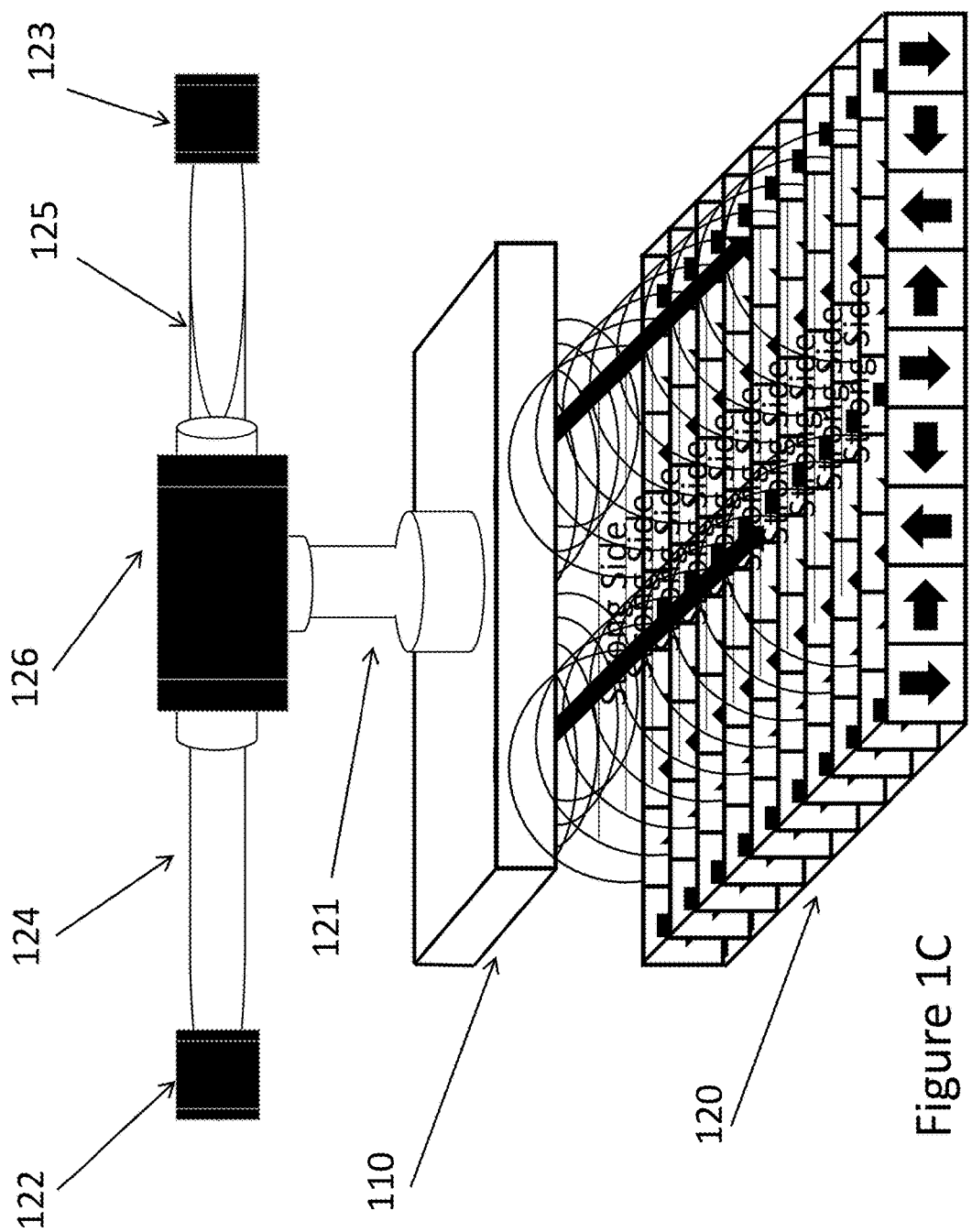

FIG. 1C depicts a Halbach array series connected to a Pressure Pump unit connected to Pressure Pump Control Unit levitating over a LTD series.

Figure 1D:
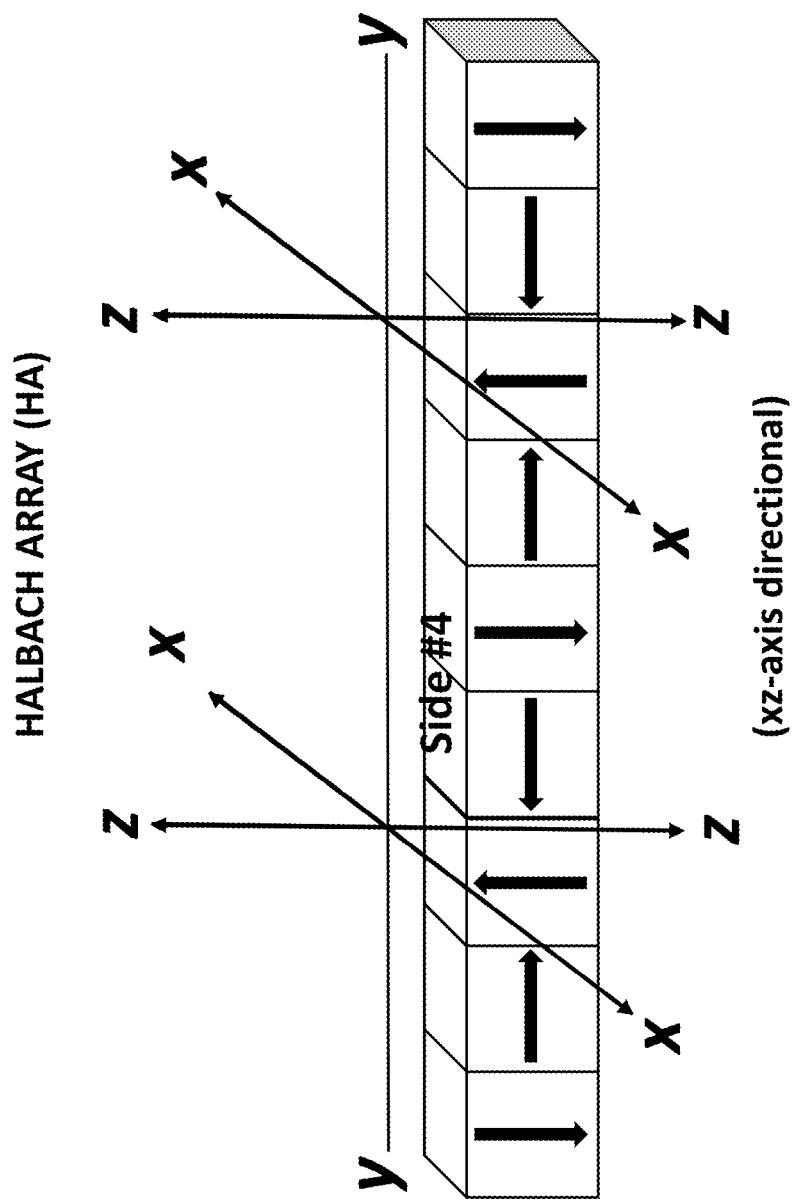

FIG. 1D depicts an xz-axis directional for a Halbach array

Figure 2A:
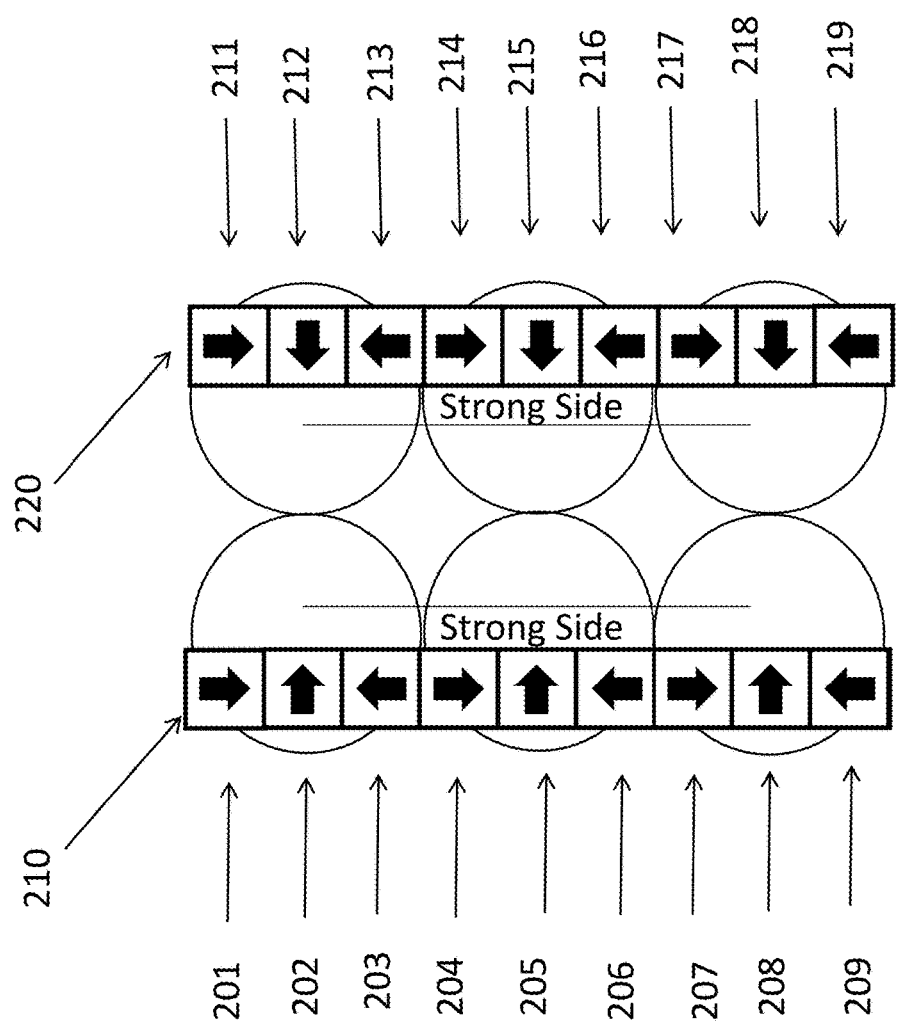

FIG. 2A depicts a Left Side Inner set of London Assemblage (LA) and an Outer set of (LA).

Figure 2B:
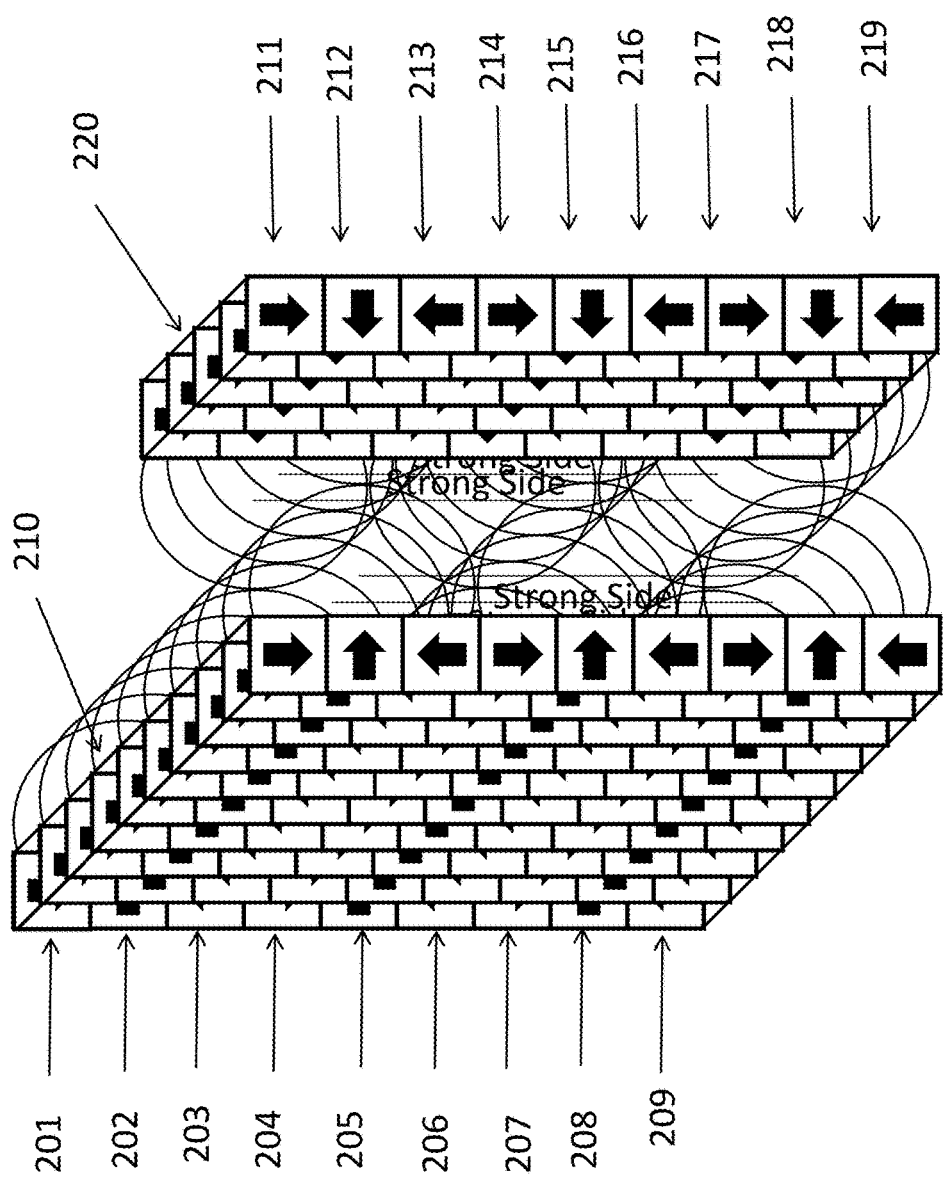

FIG. 2B depicts a series of Inner LA Lateral Stabilizers (LSL) and on its Left Side, a series of Lateral Stabilizer Track Division (LSTL) LA.

Figure 2C:
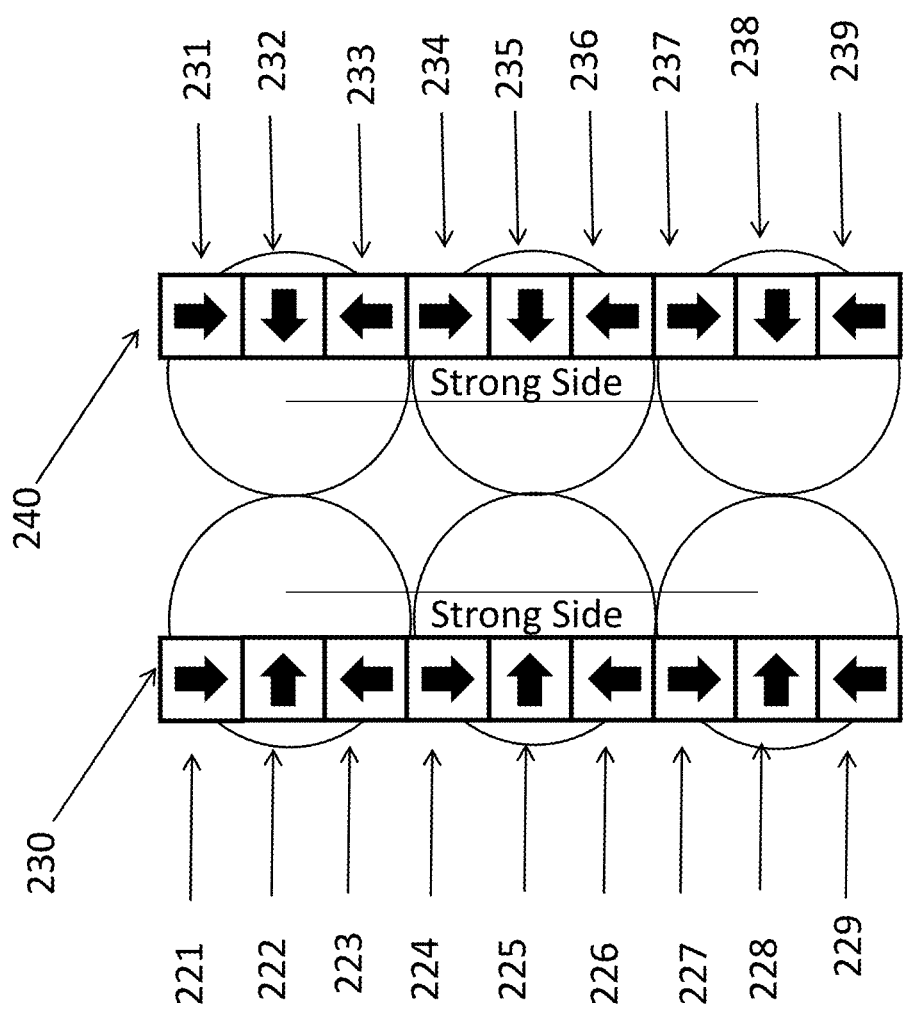

FIG. 2C depicts a Right Side Inner set of London Assemblage (LA) and an Outer set of LA.

Figure 2D:
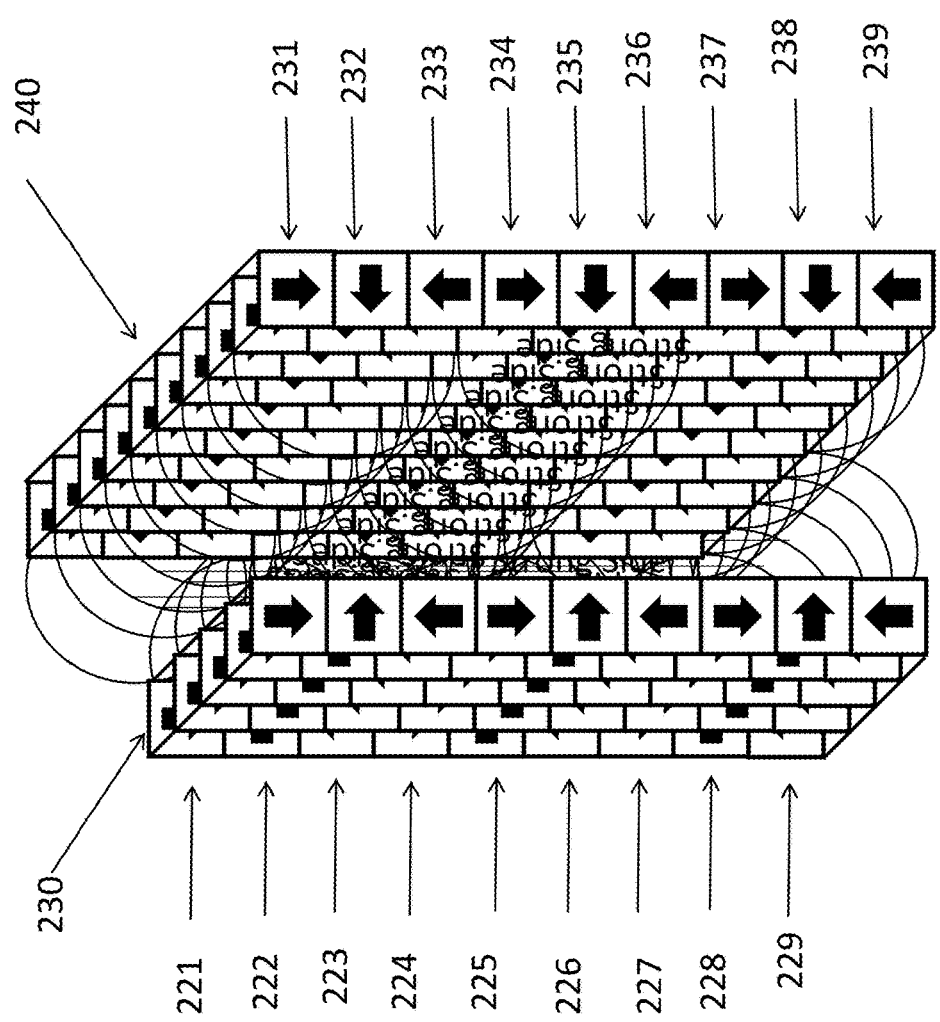

FIG. 2D depicts series of Inner LA Lateral Stabilizers (LSR) and on its Right Side, a series of Lateral Stabilizer Track Division (LSTR) LA.

Figure 2E:
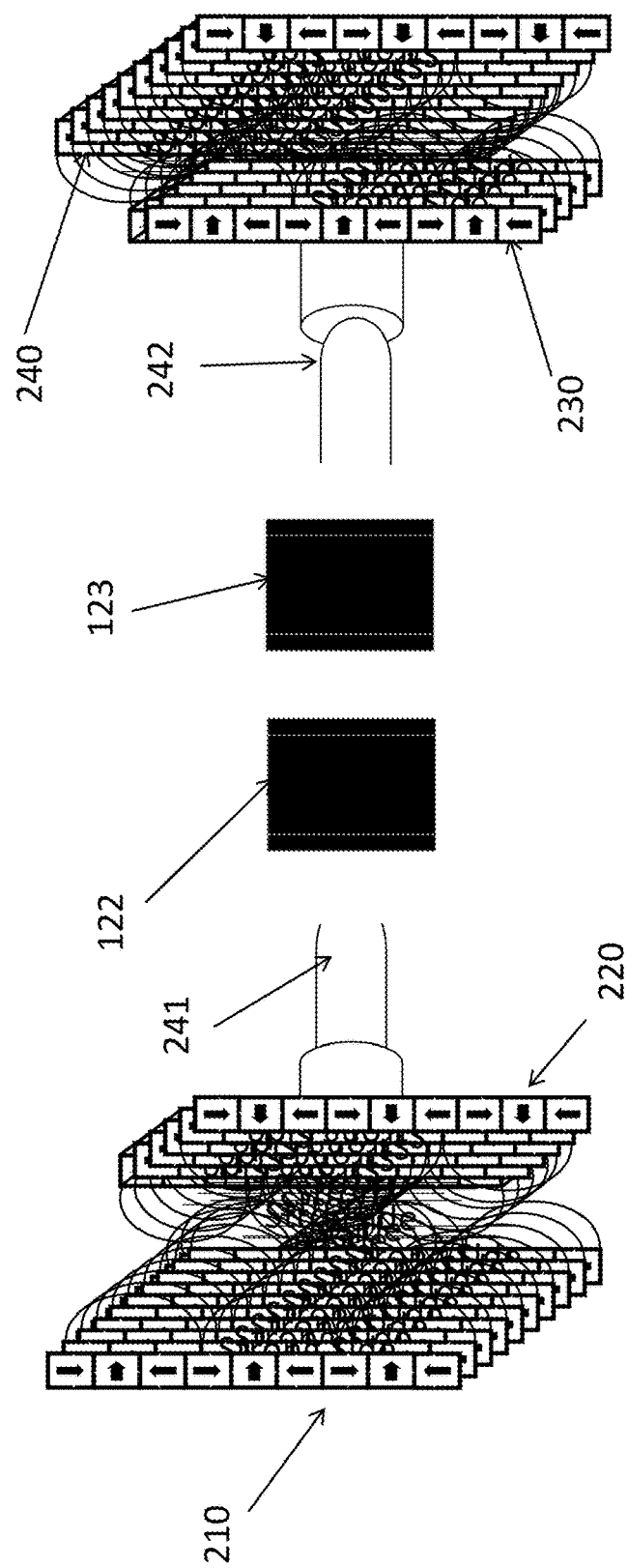

FIG. 2E depicts FIG. 2B and FIG. 2D connected to the Pressure Pump—$(P^2_{(Left-B)})$ Unit on left side and the $(P^2_{(Right-B)})$ Unit on the right side.

Figure 2F:
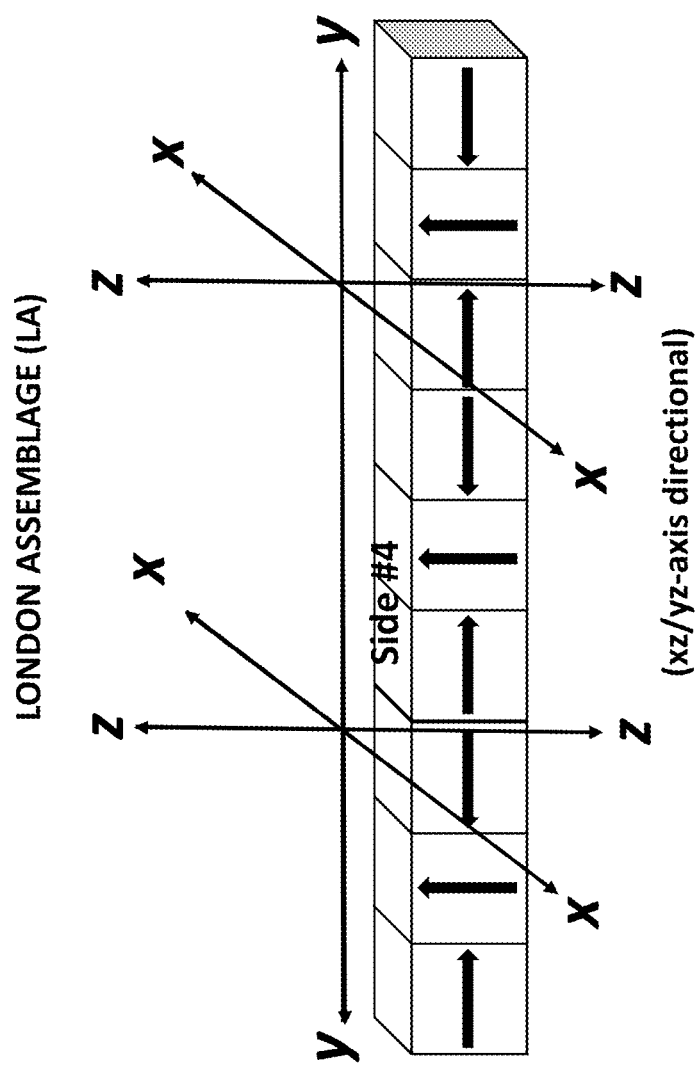

FIG. 2F depicts an xz/yz-axis directional for the LA.

Figure 3A:
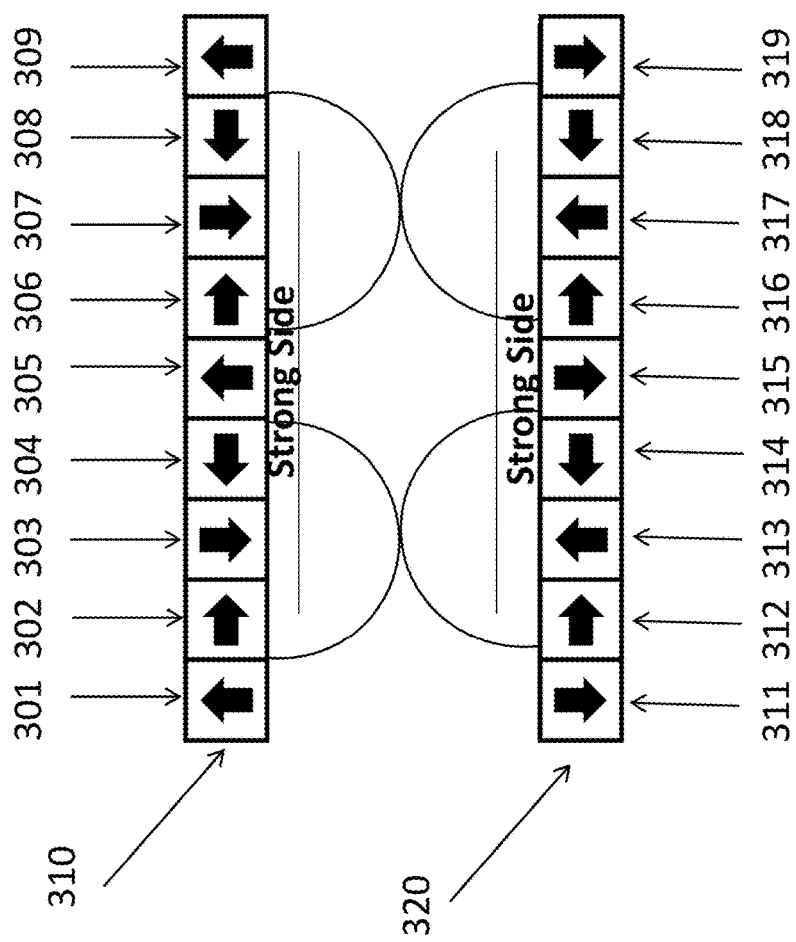

FIG. 3A depicts a Bottom Vertical Stabilizer Upper (BVSU) Halbach array and a Bottom Vertical Stabilizer Lower (BVSL) Halbach array, according to the present invention.

Figure 3B:
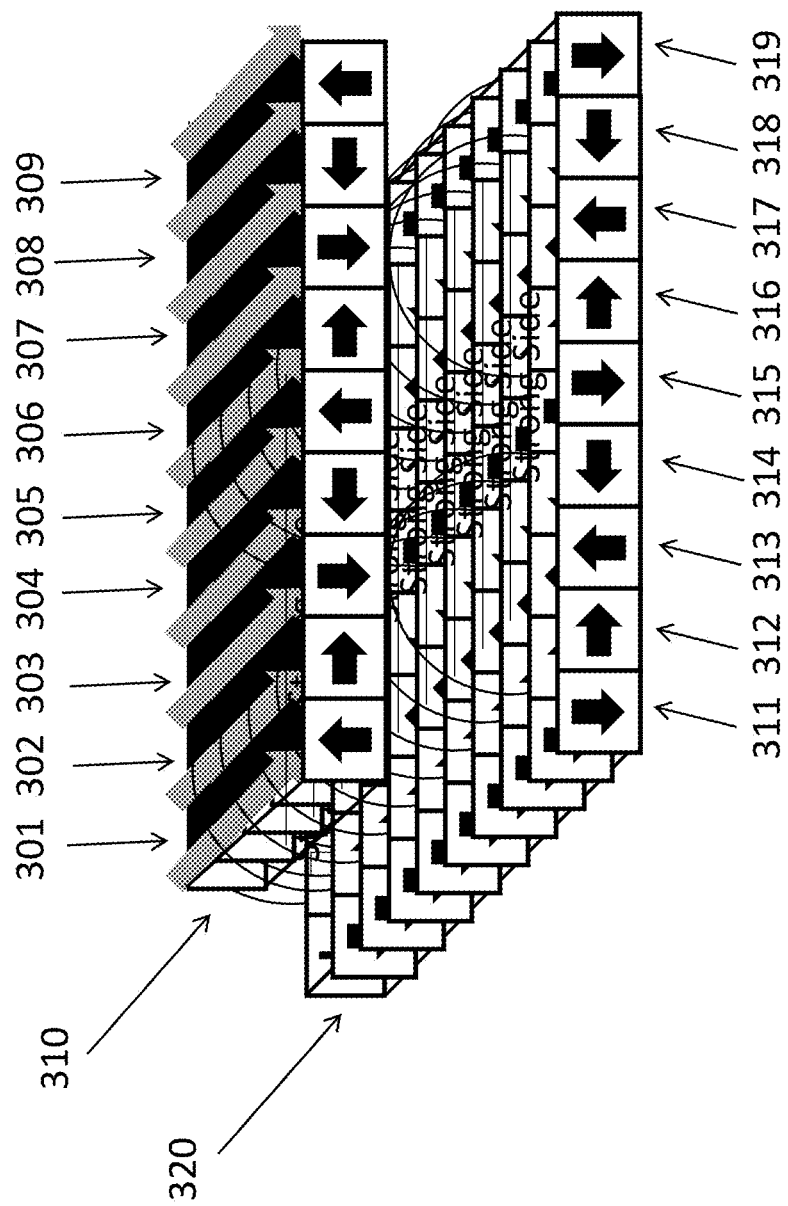

FIG. 3B depicts the BVSU series and the BVSL series and a xz-axis directional.

Figure 3C:
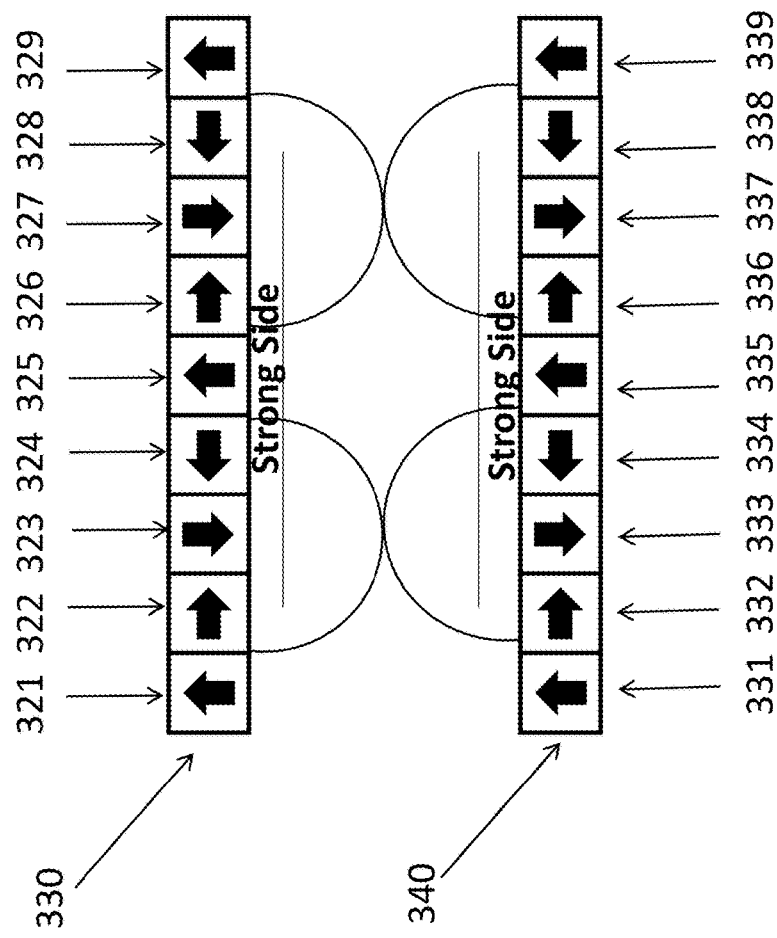

FIG. 3C depicts the Top Vertical Stabilizer Upper (TVSU) Halbach array and a Top Vertical Stabilizer Lower (TVSL) Halbach array, according to the present invention.

Figure 3D:
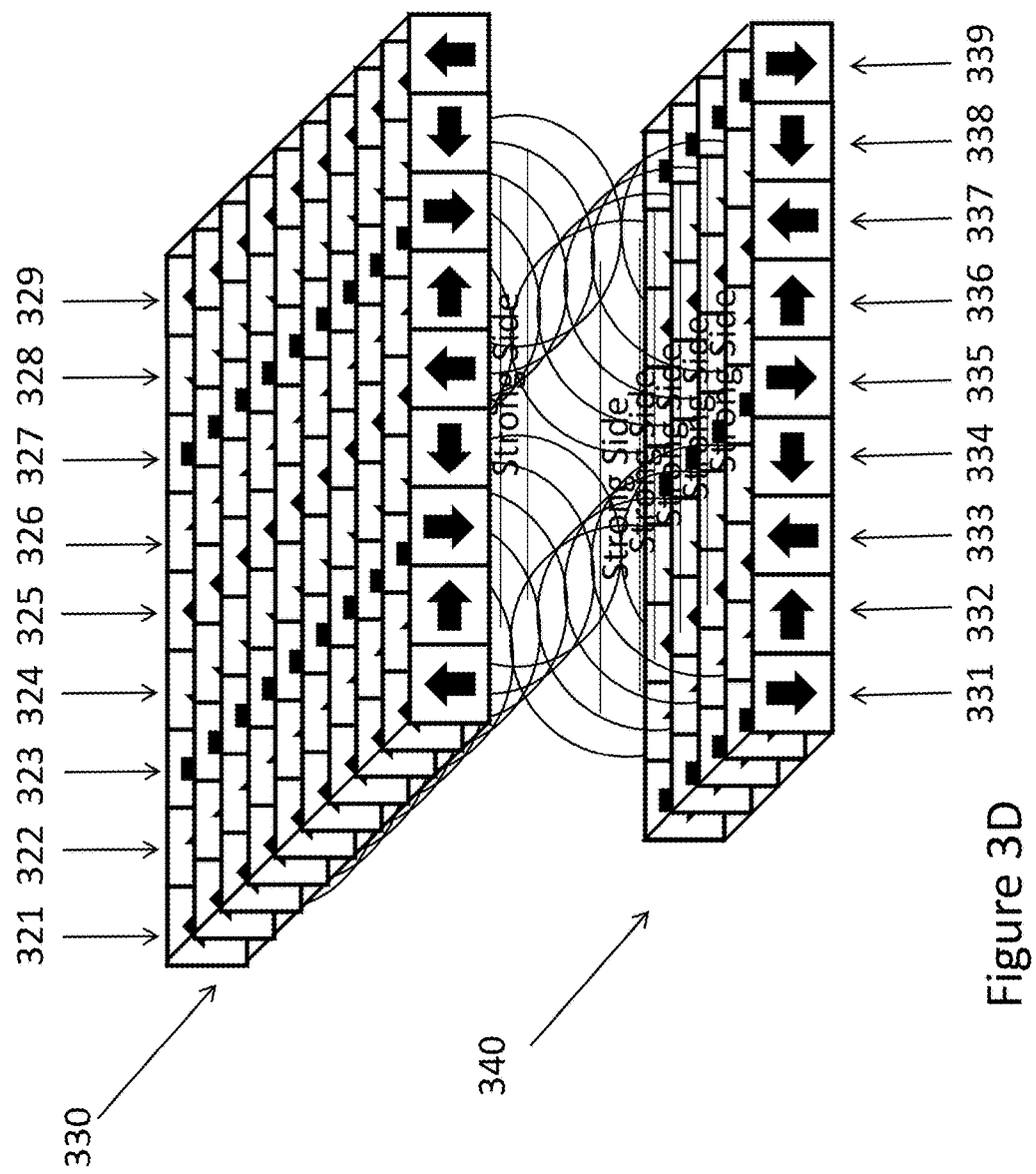

FIG. 3D depicts the TVSU series and the TVSL series and a xz-axis directional.

Figure 3E:
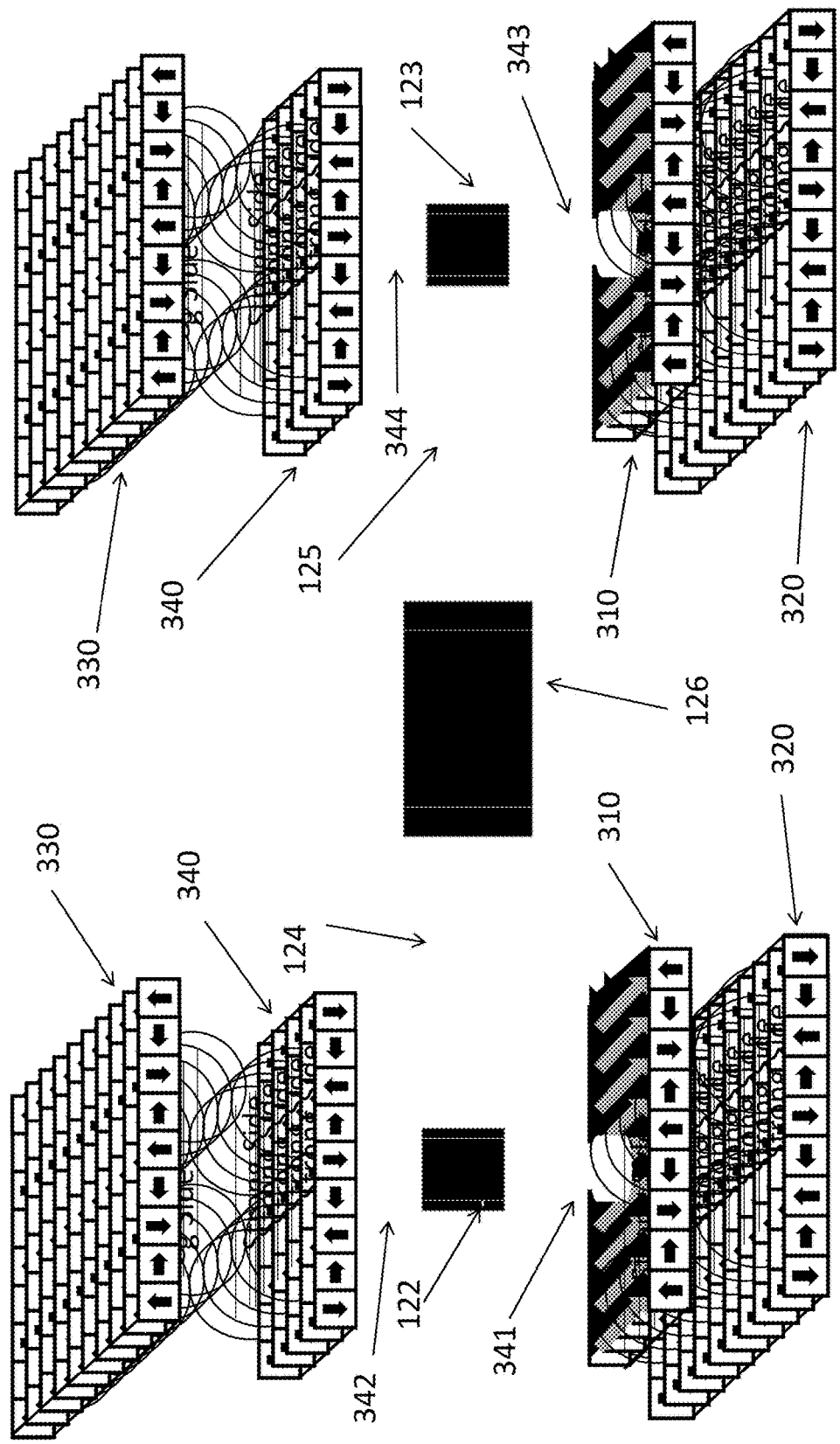

FIG. 3E depicts FIGS. 3B and 3D connected to the Pressure Pump—$(P^2_{(Left-B)})$ Unit on the left side and the $(P^2_{(Right-B)})$ Unit on the right side.

Figure 4A:
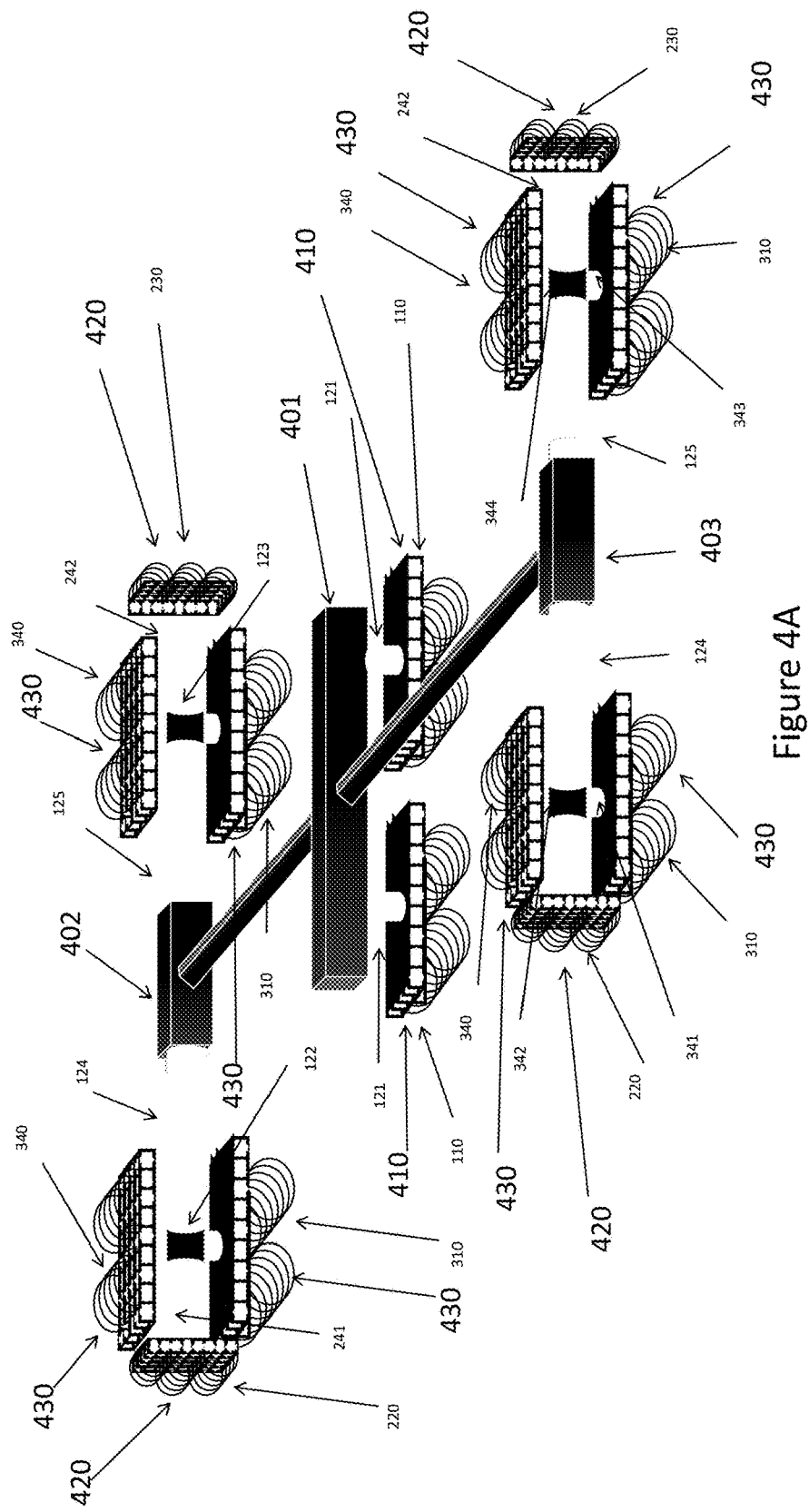

FIG. 4A depicts an Angled view of the JURLYN and the Load Support System in connection, according to the present embodiment.

Figure 4B:
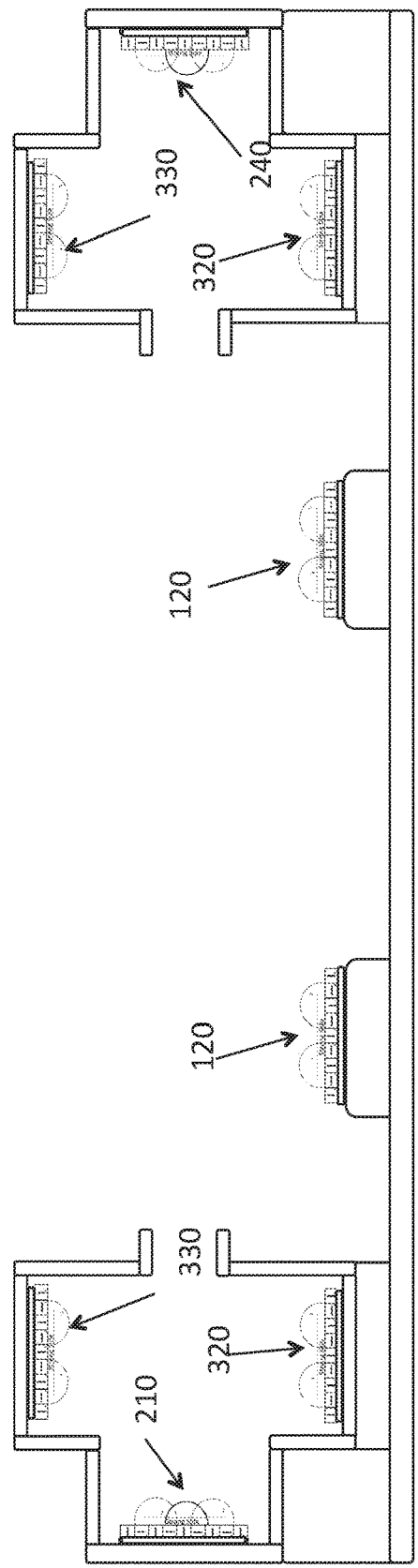

FIG. 4B depicts the Frontal view of the outer magnetic fields of force of FIGS. 1-3 according to the present embodiment.

Figure 4C:
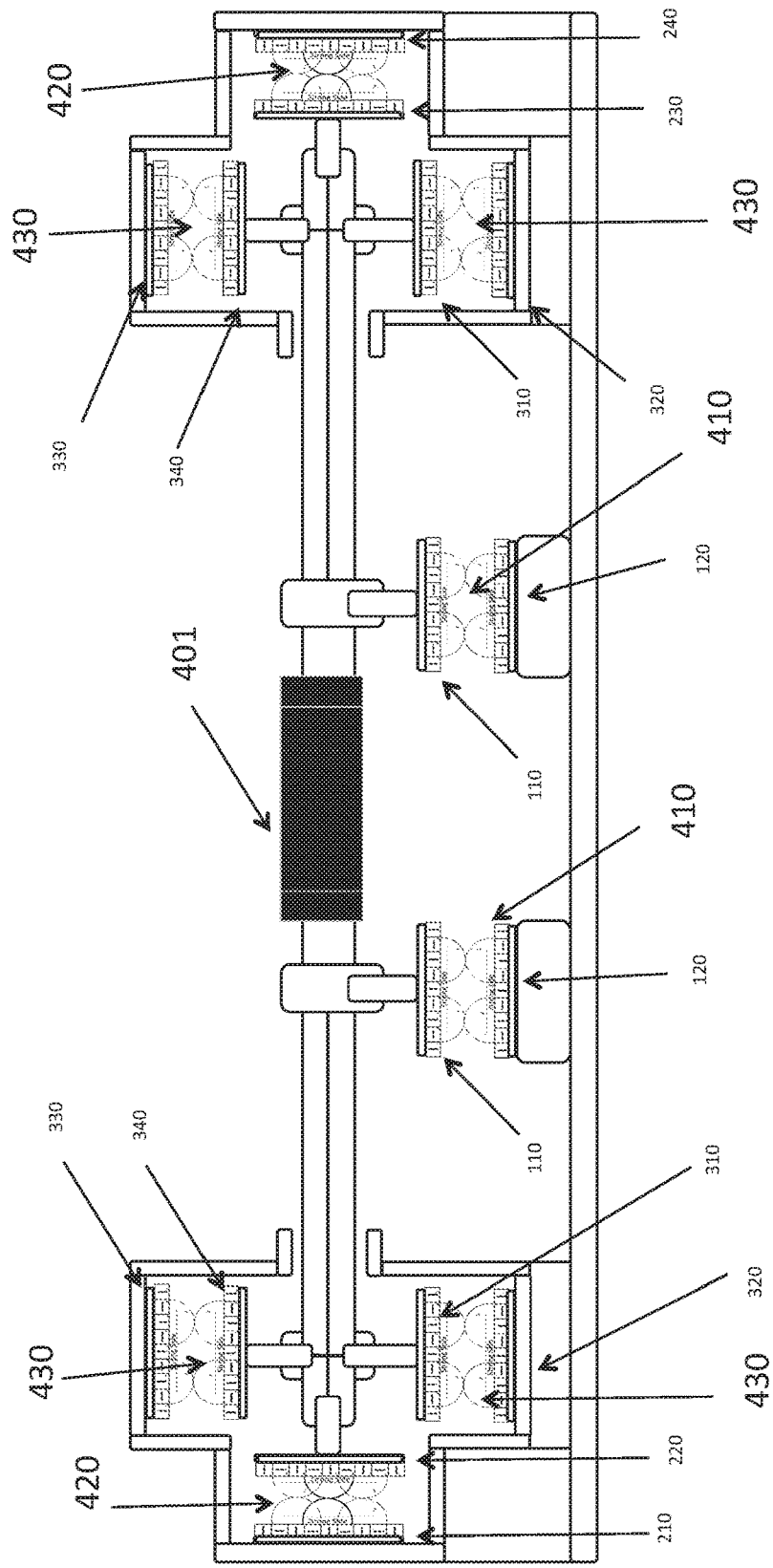

FIG. 4C depicts the Frontal view of the Load Support System and the outer magnetic fields of force interacting, according to the present embodiment.

DETAILED DESCRIPTION

It is to be understood that the disclosure of the invention in this specification includes all possible combinations of such features. For example, where a feature is disclosed in the context of a aspect or embodiment of the invention, or a claim, that feature can also be used—to the extent possible—in combination with and/or in the context of other aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100, and includes both 25 and 100.

Definitions

Halbach array: a special arrangement of permanent magnets that makes the magnetic field on one side of the array strongest of the four sides, while producing large drop edges at the far left, middle, and far right magnet (1st, 5th, & 9th magnet) of this particular configuration. Having more than one Halbach array connected in column configuration produce isolated drop edges along magnet columns 1, 5, & 9 but also isolated repelling magnetic fields of force along the xz-axis or the yz-axis, respectively at the remaining magnets (2, 3, 4, 6, 7, and 8). Its isolated stabilized continuous magnetic waves are called London Magnetic Waves (LM-Waves).

London Assemblage (LA): a special arrangement of permanent magnets that makes the magnetic field on one set of the magnet have minimized drop edges on all sides of its particular configuration. Having more than one LA connected in a particular configuration can produce magnetic fields of force to emanate characteristics on the xz-axis and yz-axis at the same location. Its stabilized multidirectional magnetic waves are called London Assemblage Waves (LA-Waves).

The repelling magnetic forces in the present invention are produced by the interaction of a flux-concentrated magnetic field of force, produced by permanent magnets configured in a Halbach array or London Assemblage, against a second set of flux-concentrated magnetic fields of force produced by a second set of permanent magnets configured in a Halbach array or London Assemblage, respectively.

When one such interaction is placed in a series of Halbach array columns and set in the fashion of a track with respect to the other magnetic fields of force; the combined magnetic fields of force maintains a stable and leveled sheet consisting of magnetic fields of force that can be used for repelling or attracting along the xz-axis. FIG. 1E depicts a Halbach array in the xz-directional. For levitation and for continuance lift to the upper Halbach array, the lower magnetic fields of force interact back on the upper magnetic fields of force to produce a repelling force. These repelling magnetic fields of forces may be applied to levitate a high-speed object such as a train or any other type of load within the weight limits of the magnetic field along the xz-axis.

FIG. 1A shows an Upper Halbach array and a Lower Halbach array with vertical magnetic fields of force repelling according to the present invention. This configuration could be attached to and located on each side of a train car or any load. The orientation of the Levitated Row (LR) Halbach arrays in the center portion are LR100 110 and the Lower Track Division (LTD) of Halbach array being LTD200 120 is such that the horizontal components of the magnetic fields of force add, while their vertical components repel. Note the three individual inner magnet poles LR101 101, LR105 105 and LR109 109 of array LR100 110 and LTD201 111, LTD205 115 and LTD209 119 of array LTD200 120 are pointed away from the mid-plane between the arrays and the two individual center magnet poles LR103 103, LR107 107 of array LR100 110 and LTD203 113, LTD207 117 of array LTD200 120 are pointed toward the mid-plane. Poles LR102 102, LR104 104 and LR106 106, LR108 108 of array LR100 110 and poles LTD202 112, LTD204 114 and LTD206 116, LTD208 118 of array LTD200 120 point toward the center pole of the respective array producing the magnetic fields of force in the vertical plane.

With such a magnet configuration, no current is needed from an electronic grid or external source to produce lift or levitation to the load. This is because there is a magnetic field of force present in one Halbach array to yield a repelling magnetic field of force from a second set of Halbach array and this interaction between the two Halbach arrays produce a stable levitation environment for any load. Also notable is the presence of a continuous magnetic field of force being exerted between the two Halbach arrays. An advantage of such a system is that it provides a mode for a centering action that could be employed either vertically or horizontally.

Another advantage of the present configuration is that it produces a doubling magnetic field of force of the vertical field from the magnets, leading to an increased levitation force per unit area for a given array. Thus, by increasing the area of the Halbach arrays the levitation efficiency may be increased. This effect can be accomplished by either adjusting the Lower Halbach array to make it thinner with respect to the Upper array or by making the Upper array wider with respect to the Lower array.

FIG. 1B shows five (5) columns of Upper Halbach array 110 and ten (10) columns of Lower Track Division (LTD) Halbach array 120 with vertical magnetic fields of force repelling along the xz-axis according to the present invention. This Upper configuration may be attached to and located on four (4) sides of a train car or another type of load. The orientation of the arrays in the center portion LR100 110 series of the levitated Halbach array and LTD200 120 series columns of Halbach array is such that the horizontal (xz-axis) components of the magnetic fields of force add, while their vertical components repel. The five (5) columns, and each column consisting of two (2) inner poles LR103 103 and LR107 107 of array LR100 110 series and LTD203 113 and LTD207 117 of array LTD200 120 series are pointed towards the mid-plane between the arrays. Poles LR101 101, LR105 105 and LR109 109 of array LR100 110 series and LTD201 111, LTD205 115 and LTD209 119 of array LTD200 120 series are pointed away from the mid-plane between the arrays. Poles LR102 102, LR104 104 and LR106 106, LR108 108 of the five (5) column array LR100 110 series and poles LTD202 112, LTD204 114 and LTD206 116, LTD208 118 of array LTD200 120 series point toward the center pole of each of their respective column and respective array, thereby, directing the column of magnetic field of force between them to produce a stable levitation field.

FIG. 1C shows the connection of a Pressure Pump (Lev-1) 121 unit and the embodiment in FIG. 1B. This connection controls the gap distance between the LR100 series 110 and the LTD200 120 series magnetic fields of force. This pressure pump 121 is attached to the LR100 110 series casement and performs adjustments upon the casement of the LR100 110 series thereby, moving the magnetic fields of force of that casement with advancements toward and away from LTD200 120 series magnetic fields of force.

The Pressure Pump (Lev-1) 121 actions establish stable magnetic fields of force at rest; at initial momentum from rest, and also at continuous pump adjustments throughout load acceleration and deceleration until the load, again, comes to a state of rest.

As the command from $P^2C_{(Main)}$ 126 for initial momentum is given to $P^2_{(Lev-1)1}$ 121, $P^2_{(Lev-1)}$ 121 maintains a stable continuous gap distance by making constant and consistent small adjustments to the casement of the LR100 110 series magnetic fields of force as it initializes a momentum from its rest state levitating on-top of the LTD200 120 series. Once a stable field is established and the load is at an equilibrium, $P^2_{(Lev-1)}$ 121 may continually be commanded to initiate movements inward and outward to elevate and reduce the position of the load, as needed, to a position of load stability.

As the command from $P^2C_{(Main)}$ 126 for acceleration and deceleration is given to $P^2_{(Lev-1)}$ 121, $P^2_{(Lev-1)}$ 121 maintains a stable continuous gap distance by making constant and consistent large and small adjustments to the casement of the LR100 110 series magnetic fields of force as it initializes its acceleration and deceleration mode while on-top of the LTD200 120 series. Once a stable field is established and the load is at an equilibrium, $P^2_{(Lev-1)}$ 121 may continually be commanded to initiate movements inward and outward to elevate and reduce the position of the load, as needed, to a position of load stability until the load come to a state of rest again.

$P^2C_{(Main)}$ 126 also initiates commands through $P^2_{(Left-Side)}$ 124 to the $P^2C_{(Left-Side)}$ 122, as well as, through $P^2_{(Right-Side)}$ 125 to the $P^2C_{(Right-Side)}$ 123. For an even greater stabilized mode for the load, the Left and Right $P^2C$ 122 123 units each control three separate Pressure Pumps that are attached to them, respectively, with each side having a set of casements housing Halbach arrays magnetic fields of force.

FIG. 2A depicts the orientation of the London Assemblage (LA) in the Lateral Stabilizer Left (LSL) portion LSL200 210 of the Outer LA and the LSL100 220 of the Inner LA is such that the orientation of the vertical components of the magnetic fields of force add, while the orientation of their horizontal components repels. The three magnet poles LSL202 202, LSL205 205 and LSL208 208 of the LSL200 210 and LSL102 212, LSL105 215 and LSL108 218 of the LSL100 220 are pointed towards the midplane between the arrays. Poles LSL201 201, LSL203 203 and LSL204 204, LSL206 206 and LSL207 207, LSL209 209 of the LSL200 210 and poles LSL101 211, LSL103 213 and LSL104 214, LSL106 216 and LSL107 217, LSL109 219 of the LSL100 220 point toward the center pole of their respective array, producing the magnetic field of force in the horizontal plane.

With such a magnet configuration, no current is needed from the electronic grid or from any external source, to produce lateral stability to the left or right of the load. This is because there is a magnetic field of force present in one LA to yield a repelling magnetic field of force onto a second LA set. The interaction between the two LA's produces a stable lateral environment for any load within the specs of their lateral pushing perimeters. There is also a presence of a continuous magnetic field of force being exerted between the two LA's. An advantage of such a system is that it provides a centering action to the lateral ends of a load, one that could be employed either vertically or horizontally. FIG. 2F depicts a London Assemblage on the xz/yz directional.

Another advantage of the present configuration is that it produces a tripling magnetic field of force of the horizontal field from the magnets, as opposed to a doubling magnetic field of force. This leads to an increased LSL force per unit area for a given array.

Thus, by increasing the area of the LA's, one can attain LSL, and thus increase the LSL efficiency. This effect can be accomplished by either adjusting the LSL200 210 to make it thinner with respect to the LSL100 220 array or by making the LSL100 220 wider with respect to the LSL200 210 or by maintaining their margins to be equal to the other. Even again, another advantage is that, the need to use the grid is virtually eliminated from both the load usage for lateral movement and the Track Division has no need to use the grid for power to maintain current for continuance lateral movement on a load.

FIG. 2B shows five (5) columns of Inner LA's (LSL) 220 and ten (10) Outer columns of LA's 210, called Lateral Stabilizer Track Division-Left Side (LSTL), with horizontal magnetic fields of force is such that the orientation of the vertical components of the magnetic fields of force add, while the orientation of their horizontal components repels of magnetic fields of force. The Halbach arrays are oriented to repel horizontally according to the present invention. The Inner magnetic fields of force configuration may be attached to and located on the left side of a train car or a certain type of load to encounter and repel against the magnetic fields of force of LSTL. The objective of the array is to orientate magnetic fields of force on the Left Side of the load against the magnetic fields of force on the Right Side of the same load, in such a way, that, they combine produce a centered focal point for the load.

Note the three magnet poles LSL102 212, LSL105 215 and LSL108 218 of the LSL100 220 series and LSTL202 202, LSTL205 205 and LSTL208 208 of the LSTL200 210 series are pointed towards the mid-plane between the arrays. Poles LSTL201 201, LSTL203 203 and LSTL204 204, LSTL206 206 and LSTL207 207, LSTL209 209 of the LSTL200 210 series and poles LSL101 211, LSL103 213 and LSL104 214, LSL106 216 and LSL107 217, LSL109 219 of the LSL100 220 series point toward the center pole of their respective array, producing the magnetic field of force in the horizontal plane.

With such a magnet configuration, no current is needed from the electronic grid or from any external source, to produce lateral stability to the left or right of the load, because, there is a magnetic field of force present in one LA to yield a repelling magnetic field of force against a second LA set and this interaction between the two LA's produce a stable lateral environment for any load within the specs of their lateral pushing perimeters. There is also the presence of a continuous magnetic field of force being exerted between the two LA's. An advantage of such a system is that it provides a centering action to the lateral ends of a load, one that could be employed either vertically or horizontally.

FIG. 2C depicts the orientation of the LA in the Lateral Stabilizer Right portion LSR200 240 the Outer LA and the LSR100 230 series the Inner LA is such that the orientation of the vertical components of the magnetic fields of force add, while the orientation of their horizontal components repels. The three magnet poles LSR208 238, LSR205 235 and LSR202 232 of the LSR200 240 and LSR108 228, LSR105 225 and LSR102 222 of the LSR100 230 series are pointed towards the midplane between the arrays. Poles LSR201 231, LSR203 233 and LSR204 234, LSR206 236 and LSR207 237, LSR209 239 of array LSR200 240 and poles LSR101 221, LSR103 223 and LSR104 224, LSR106 226 and LSR107 227, LSR109 229 of array LSR100 230 series point toward the center pole of the respective array producing the magnetic field of force in the horizontal plane.

With such a magnet configuration, no current is needed from the electronic grid or from any external source, to produce lateral stability to the left or right of the load, because, there is a magnetic fields of force present in one LA to yield a repelling magnetic field of force from a second LA set and this interaction between the two LA's produce a stable lateral environment for any load within the specs of their lateral pushing perimeters. There is also a presence of a continuous magnetic field of force being exerted between the two LA. An advantage of such a system is that it provides a centering action to the lateral ends of a load, one that could be employed either vertically or horizontally.

FIG. 2D shows five (5) columns of Inner LA (LSR) 230 and ten (10) Outer columns of LA 240, called Lateral Stabilizer Track Division-Right Side (LSTR), with horizontal magnetic fields of force is such that the orientation of the vertical components of the magnetic fields of force add, while the orientation of their horizontal components repel of magnetic fields of force. The LA's are oriented to repel horizontally according to the present invention. The Inner magnetic fields of force configuration (LSR) could be attached to and located on the left side of a train car or a certain type of load to encounter and repel against the magnetic fields of force of LSTR. The objective of the array is to orientate magnetic fields of force on the Right Side of the load against the magnetic fields of force on the Left Side of the load, in such a way, that, they combine to produce a center focal point onto the load.

Note the three magnet poles LSR102 222, LSR105 225 and LSR108 228 of array LSR100 230 series and LSTR202 232, LSTR205 235 and LSTR208 238 of array LSTR200 240 series are pointed towards the mid-plane between the LA's. Poles LSTR201 231, LSTR203 233 and LSTR204 234, LSTR206 236 and LSTR207 237, LSTR209 239 of the LSTR200 240 series and poles LSR101 221, LSR103 223 and LSR104 224, LSR106 226 and LSR107 227, LSR109 229 of the LSR100 230 series point toward the center pole of their respective array, producing the magnetic field of force in the horizontal plane.

With such a magnet configuration, no current is needed from the electronic grid or from any external source, to produce lateral stability to the left or right of the load, because, there is a magnetic fields of force present in one LA to yield a repelling magnetic field of force against a second LA set and this interaction between the two LA's produce a stable lateral environment for any load within the specs of their lateral pushing perimeters. There is also a presence of a continuous magnetic field of force being exerted between the two LA's. An advantage of such a system is that it provides a centering action to the lateral ends of a load, one that could be employed either vertically or horizontally.

The combined set of arrays LSL and LSR are made to produce an equilibrium planar for a separate and different LA set located at the center plane. The combined magnetic fields of force stabilize the center plane to its length in the direction of the magnetic fields of force and this stability is observed at load rest and continuously throughout load momentum and acceleration. The function of lateral stabilization is separate from all other functions and needs no power from any external source. By adjusting the gap distance of the field and length of the center plane magnetic fields of force, one can easily adjust LSL and LSR, the lateral stabilizer, for the center plane to maintain the desired level of centering force needed.

FIG. 2E shows the connection of the $P^2_{(Left-B)}$ 241 and $P^2_{(Right-B)}$ 242 to their respective column LSL100 220 and LSR100 230 series. Both $P^2$ 241 242 controls the gap distance between their perspective LSL/LSR100 220 230 series and LSTL200/LSTR200 210 240 series magnetic fields of force. Their pressure pumps are attached to their respective inner series casement and perform adjustments to their particular casement thereby, moving the magnetic fields of force of that particular casement with advancements toward and away from the magnetic fields of force of its LSTL200 210 and LSTR200 240, respectively.

The $P^2_{(Left-B)}$ 241 and $P^2_{(Right-B)}$ 242 combined actions establish stable magnetic fields of force at load rest and at initial momentum from load rest. During load acceleration and deceleration, continuous pump adjustments are observed to maintain load stability until the load, again, come to a state of rest.

At rest, $P^2C_{(Left\ Side)}$ 122 and $P^2C_{(Right\ Side)}$ 123 initiate commands to $P^2_{(Left-B)}$ 241 and $P^2_{(Right-B)}$ 242, respectively, to perform the functions needed to increase and decrease the length of the pump. At rest, $P^2C_{(Left\ Side)}$ 122 and $P^2C_{(Right\ Side)}$ 123 initiates a command to $P^2_{(Left-B)}$ 241 and $P^2_{(Right-B)}$ 242 respectively, to perform the functions needed to increase and decrease the length of the pump. This action on the pump enables the gap distance between both $P^2_{(Left-B)}$ 241 and $P^2_{(Right-B)}$ 242 and their respective LSTL200 210 series and the LSTR200 240 series, to be adjusted to a stable position. The magnetic fields of force at both $P^2_{(Left-B)}$ 241 and $P^2_{(Right-B)}$ 242 rest against the magnetic fields of force of the LSTL200 210 series and LSTR200 240 series, respectively; waiting for the next command sequence of instructions.

As the command for initial momentum is given from $P^2C_{(Left\ Side)}$ 122 and $P^2C_{(Right\ Side)}$ 123, respectively, to $P^2_{(Left-B)}$ 241 and $P^2_{(Right-B)}$ 242, both magnetic fields of force of $P^2_{(Left-B)}$ 241 and $P^2_{(Right-B)}$ 242 maintain a stable continuous gap distance by making constant and consistent small adjustments to the casement the LSL100 220 series of magnetic fields of force until load stability is obtained. As initial momentum is initialized, $P^2C_{(Left\ Side)}$ 122 and $P^2C_{(Right\ Side)}$ 123 maintain a stable magnetic field of force by the continual tweaking of $P^2_{(Left-B)}$ 241 and $P^2_{(Right-B)}$ 242, respectively, and the load maintains an equilibrium. $P^2_{(Left-B)}$ 241 and $P^2_{(Right-B)}$ 242 may continually be commanded to initiate movements inward and outward to increase and reduce the gap position of the load, as needed, to a position of load stability.

As the command from $P^2C_{(Left\ Side)}$ 122 and $P^2C_{(Right\ Side)}$ 123, respectively, is given to $P^2_{(Left-B)}$ 241 and $P^2_{(Right-B)}$ 242 for load acceleration and deceleration, each side simultaneously synchronizes an increase and reduction to their magnetic fields of force gap position on the load, as needed, to a position of load stability. To maintain a stable continuous gap distance throughout the acceleration and deceleration mode, $P^2_{(Left-B)}$ 241 and $P^2_{(Right-B)}$ 242 movements must be constant and consistently in sync with their adjustments. Once a stable field is established and the load is at an equilibrium, $P^2_{(Left-B)}$ 241 and $P^2_{(Right-B)}$ 242, may continually be commanded to initiate movements inward and outward to maintain the position of the load, as needed, to a position of load stability until the load come to a state of rest again.

The new configuration would provide an energy-efficient means for lateral yawing stabilization. FIG. 2E combining the embodiments from FIG. 2B and FIG. 2D, depicts a magnet configuration in which the functions of generating the stabilizing magnetic fields of force and producing lateral stability are separate from the levitation and propulsion systems; giving the advantage of being able to tailor and control these functions optimally for their applications.

FIG. 3A shows the Bottom portion of a Vertical Stabilizer unit in its single stage to consist of an Upper Halbach array and a Lower Halbach array with Vertical magnetic fields of force repelling and attracting according to the present invention. This configuration could be attached to and located on each side of a load. The orientation of the arrays in the center portion BVSU100 310 the Upper Halbach array and array BVSL200 320 the Lower Halbach array is such that the horizontal components of the magnetic fields of force add, while their Vertical components repel and attract. The three inner poles BVSU101 301, BVSU105 305 and BVSU109 309 of array BVSU100 310 and BVSL201 311, BVSL205 315 and BVSL209 319 of array BVSL200 320 are pointed away from the mid-plane between the arrays and the two center poles BVSU103 303, BVSU107 307 of array BVSU100 310 and BVSL203 313, BVSL207 317 of array BVSL200 320 are pointed toward the mid-plane. Poles BVSU102 302, BVSU104 304 and BVSU106 306, BVSU108 308 of array BVSU100 310 and poles BVSL202 312, BVSL204 314 and BVSL206 316, BVSL208 318 of array BVSL200 320 point toward the center pole of the respective array producing the magnetic fields of force in the Vertical plane.

With such a magnet configuration, no current is needed from the electronic grid or from any external source to produce Upward and Downward action onto the load, because, there is a magnetic fields of force present in one Halbach array to yield a repelling and attracting magnetic field of force from a second set of Halbach arrays and this interaction between the two Halbach arrays produce a stable upward and downward movement onto the load environment for any load within the specs of their perimeters. Also noted is that the presence of magnetic field of force is exerting the repelling and attracting magnetic fields of force between the two Halbach arrays continuously without interruption. An advantage of such a system is that it provides a mode for a Vertical action.

Another advantage of the present configuration is that it produces a doubling magnetic field of force of the Vertical field from the magnets, leading to an increased magnetic field of force per unit area for a given array. Thus, by increasing the area of the Halbach arrays, one can ascertain momentum upward or downward, and thus increase the efficiency of motions upward and downward. This effect can be accomplished by either adjusting the Lower Halbach array to make it thinner with respect to the Upper array or by making the Upper array wider with respect to the Lower array or by maintaining their margins to be equal to the other.

A further advantage is that, the need to use the grid is virtually eliminated from both the load usage for upward and downward motion and the track has no need to use the grid for power to maintain current for continuance Vertical movement onto a load.

FIG. 3B shows the Bottom portion of the Vertical Stabilizer. It consists of an Upper horizontal column of five (5) sets of Halbach arrays called the Bottom Vertical Stabilizer Upper (BVSU) 310 series and a Lower horizontal Stabilizer Track Division column of ten (10) sets of Halbach arrays called the Bottom Vertical Stabilizer Lower (BVSL) 320 series. The Bottom portion's Upper and Lower magnetic fields of force encounter each other to produce a controlled upward and downward repelling and attracting action onto the load. The orientation of the arrays in the center portion BVSU100 310 series the Upper Halbach array and array BVSL200 320 series the Lower Halbach array is such that the horizontal components of the magnetic fields of force add, while their Vertical components repel and attract. The three inner poles BVSU101 301, BVSU105 305 and BVSU109 309 of the five (5) column set of arrays BVSU100 310 series and BVSL201 311, BVSL205 315 and BVSL209 319 of the ten (10) column set of arrays BVSL200 320 series are pointed away from the mid-plane between the arrays and the two center poles BVSU103 301, BVSU107 307 of array BVSU100 310 series and BVSL203 313, BVSL207 317 of array BVSL200 320 series are pointed toward the mid-plane. Poles BVSU102 302, BVSU104 304 and BVSU106 306, BVSU108 308 of array BVSU100 310 series and poles BVSL202 312, BVSL204 314 and BVSL206 316, BVSL208 318 of array BVSL200 320 series point toward the center pole of the respective array producing the magnetic fields of force in the Vertical plane.

This magnet configuration requires no current from the grid or from any external source to produce an Upward and Downward action onto the load. Between the Upper and Lower magnetic fields of force there is a repelling and attracting magnetic field of force encountering on the others fields. The Magnetic fields are stabilized for an upward and downward movement onto the load, within the specs of their perimeters. The magnetic fields of force between the two Halbach arrays are continuous, consistent and without interruption. An advantage of such a system is that it provides a mode for a Vertical action.

Another advantage of the present configuration is that, there is no transfer of energy, therewith, there is no heat transfer within the encounter of the Upper and Lower magnetic fields of force. Because friction is virtually eliminated, the forward momentum is continuous until a braking mechanism is engaged.

A further advantage is that, the need to use the grid is virtually eliminated from both the load usage for upward and downward motion and the track has no need to use the grid for power to maintain current for continuance of Vertical movement onto a load.

FIG. 3C shows the Top portion of a Vertical Stabilizer unit in its single stage to consist of an Upper Halbach array and a Lower Halbach array with Vertical magnetic fields of force repelling and attracting according to the present invention. This configuration could be attached to and located on each side of a train car or any load. The orientation of the arrays in the center portion TVSU200 330 the Upper Halbach array and array TVSL100 340 the Lower Halbach array is such that the horizontal components of the magnetic fields of force add, while their Vertical components repel and attract. Note the three inner poles TVSU201 321, TVSU205 325 and TVSU209 329 of array TVSU200 330 and TVSL101 331, TVSL105 335 and TVSL109 339 of array TVSL100 340 are pointed away from the mid-plane between the arrays and the two center poles TVSU203 321, TVSU207 327 of array TVSU200 330 and TVSL103 333, TVSL107 337 of array TVSL100 340 are pointed toward the mid-plane. Poles TVSU202 322, TVSU204 324 TVSU206 326, and TVSU208 328 of array TVSU200 330 and poles TVSL102 332, TVSL104 334, TVSL106 336, and TVSL108 338 of array TVSL100 340 point toward the center pole of the respective array producing the magnetic fields of force in the Vertical plane.

With such a magnet configuration, no current is needed from the electronic grid or from any external source to produce Upward and Downward action onto the load, because, there is a magnetic fields of force present in one Halbach array to yield a repelling and attracting magnetic field of force from a second set of Halbach arrays and this interaction between the two Halbach arrays produce a stable upward and downward movement onto the load environment for any load within the specs of their perimeters. Also noted is that the presence of magnetic field of force is exerting the repelling and attracting magnetic fields of force between the two Halbach arrays continuously without interruption. An advantage of such a system is that it provides a mode for a Vertical action.

Another advantage of the present configuration is that it produces a doubling magnetic field of force of the Vertical field from the magnets, leading to an increased magnetic field of force per unit area for a given array. Thus, by increasing the area of the Halbach arrays, one can ascertain momentum upward or downward, and thus increase the efficiency of motions upward and downward. This effect can be accomplished by either adjusting the Lower Halbach array to make it thinner with respect to the Upper array or by making the Upper array wider with respect to the Lower array or by maintaining their margins to be equal to the other.

A further advantage is that, the need to use the grid is virtually eliminated from both the load usage for upward and downward motion and the track has no need to use the grid for power to maintain current for continuance Vertical movement onto a load.

FIG. 3D shows the Top portion of the Vertical Stabilizer. It consists of an Upper horizontal column of ten (10) sets of Halbach arrays called the Top Vertical Stabilizer Upper (TVSU) 330 series and a Lower horizontal Stabilizer Track Division column of five (5) sets of Halbach arrays called the Top Vertical Stabilizer Lower (TVSL) 340 series. The Top portion's Upper and Lower magnetic fields of force encounter each other to produce a controlled upward and downward repelling and attracting action onto the load. The orientation of the arrays in the center portion TVSU200 330 series the Upper Halbach array and array TVSL100 340 series the Lower Halbach array is such that the horizontal components of the magnetic fields of force add, while their Vertical components repel and attract. The three inner poles TVSU201 321, TVSU205 325 and TVSU209 329 of the ten (10) column set of arrays TVSU200 330 series and TBVSL101 331, TVSL105 335 and TVSL109 339 of the five (5) column set of arrays TVSL100 340 series are pointed away from the mid-plane between the arrays and the two center poles TVSU203 323, TVSU207 327 of array TVSU200 330 series and TVSL103 333, TVSL107 337 of array TVSL100 340 series are pointed toward the mid-plane. Poles TVSU202 322, TVSU204 324, TVSU206 326, and TVSU208 328 of array TVSU200 330 series and poles TVSL102 332, TVSL104 334 and TVSL106 336, TVSL108 338 of array TVSL100 340 series point toward the center pole of the respective array producing the magnetic fields of force in the Vertical plane.

This magnet configuration requires no current from the grid or from any external source to produce an Upward and Downward action onto the load. Between the Upper and Lower magnetic fields of force there is a repelling and attracting magnetic field of force encountering on the others fields. The Magnetic fields are stabilized for an upward and downward movement onto the load, within the specs of their perimeters. The magnetic fields of force between the two (2) Halbach arrays are continuous, consistent and without interruption. An advantage of such a system is that it provides a mode for a Vertical action.

Another advantage of the present configuration is that, there is no transfer of energy, therewith, there is no heat transfer within the encounter of the Upper and Lower magnetic fields of force. Because friction is virtually eliminated, forward momentum is continuous until a braking mechanism is engaged.

A further advantage is that, the need to use the grid is virtually eliminated from both the load usage for upward and downward motion and the track has no need to use the grid for power to maintain current for continuance of Vertical movement onto a load.

FIG. 3E shows the connection of the $P^2_{(Left-A\ and\ C)}$ 342 341 and $P^2_{(Right-A\ and\ C)}$ 344 343 to their designated column BVS(U/L)100 310 320 series and TVS(U/L)100 series 330 340, respectively. $P^2_{(Left-A\ and\ C)}$ 342 341 and $P^2_{(Right-A\ and\ C)}$ 344 343 control the gap distance between their BVSU100 310 series to BVSL200 320 series and TVSU100 330 series to TVSL200 340 series magnetic fields of force. Their pressure pumps are attached to the BVSU100 series 310 and TVSL100 340 series casement, respectively, and perform adjustments to the casement thereby, moving the magnetic fields of force of that casement with advancements toward and away from the magnetic fields of force of BVSL200 320 series and TVSU200 330 series, respectively.

The $P^2_{(Left-A\ and\ C)}$ 342 341 and $P^2_{(Right-A\ and\ C)}$ 344 343 combine their actions to establish stable magnetic fields of force at load rest; and at initial momentum from load rest. During load acceleration and deceleration, continuous pump adjustments are observed to maintain load stability until the load, again, come to a state of rest.

For rest, $P^2C_{(Main)}$ 126 initiates a command to $P^2C_{(Left\ Side)}$ 122 and $P^2C_{(Right\ Side)}$ 123. $P^2C_{(Left\ Side)}$ 122 and $P^2C_{(Right\ Side)}$ 123 then initiates a command to $P^2_{(Left-A\ and\ C)}$ 124 and $P^2_{(Right-A\ and\ C)}$ 125, respectively, to perform the functions needed to increase and decrease the length of the pump. This action on the pump enables the gap distance between both $P^2_{(Left-A\ and\ C)}$ 342 341 and $P^2_{(Right-A\ and\ C)}$ 344 343 and BVSL200 320 series columns and the TVSU200 330 series, respectively, to be adjusted to a stable position. The magnetic fields of force at both $P^2$ (Left-A and C) 342 341 and $P^2_{(Right-A\ and\ C)}$ 344 343 columns rest against the magnetic fields of force of columns BVSL200 320 series and TVSU200 330 series, respectively; awaiting for the next command sequence of instructions.

For initial momentum, $P^2C_{(Main)}$ 126 initiates a command to $P^2C_{(Left\ Side)}$ 122 and $P^2C_{(Right\ Side)}$ 123. $P^2C_{(Left\ Side)}$ 122 and $P^2C_{(Right\ Side)}$ 123 then initiates a command to $P^2_{(Left-A\ and\ C)}$ 342 341 and $P^2_{(Right-A\ and\ C)}$ 344 343 respectively, to perform the functions needed to increase and decrease the length of the pump. As the command for initial momentum is given from $P^2C_{(Left\ Side)}$ 122 and $P^2C_{(Right\ Side)}$ 123, respectively, to $P^2_{(Left-A\ and\ C)}$ 342 341 and $P^2_{(Right-A\ and\ C)}$ 344 343, both magnetic fields of force maintain a stable continuous gap distance by making constant and consistent small adjustments to the casement of BVSU100 310 series columns and TVSL100 340 series columns of magnetic fields of force until load stability is obtained. As initial momentum is initialized, $P^2C_{(Left\ Side)}$ 122 and $P^2C_{(Right\ Side)}$ 123 maintains a stable magnetic field of force by the continual tweaking of $P^2_{(Left-A\ and\ C)}$ 342 341 and $P^2_{(Right-A\ and\ C)}$ 344 343, respectively, and the load maintains an equilibrium. $P^2_{(Left-A\ and\ C)}$ 342 341 and $P^2_{(Right-A\ and\ C)}$ 344 343 may continually receive commands to initiate movements inward and outward to increase and reduce the gap position of the load, as needed, to a position of load stability.

For Acceleration and Deceleration, $P^2C_{(Main)}$ 126 initiates a command to $P^2C_{(Left\ Side)}$ 122 and $P^2C_{(Right\ Side)}$ 123. $P^2C_{(Left\ Side)}$ 122 and $P^2C_{(Right\ Side)}$ 123 then initiates a command to $P^2_{(Left-A\ and\ C)}$ 342 341 and $P^2_{(Right-A\ and\ C)}$ 344 343, respectively, to perform the functions needed to increase and decrease the length of the pump. As the command from $P^2C_{(Left\ Side)}$ 122 and $P^2C_{(Right\ Side)}$ 123, respectively, is given to $P^2_{(Left-A\ and\ C)}$ 342 341 and $P^2_{(Right-A\ and\ C)}$ 344 343 for load acceleration and deceleration, each side simultaneously synchronizes an increase and reduction to their magnetic fields of force gap position on the load, as needed, to a position of load stability. To maintain a stable continuous gap distance throughout the acceleration and deceleration mode, $P^2_{(Left-A\ and\ C)}$ 342 341 and $P^2_{(Right-A\ and\ C)}$ 344 343 movement must be constant and consistently in sync of their large and small adjustments. Once a stable field is established and the load is at an equilibrium. $P^2_{(Left-B)}$ 124 and $P^2_{(Right-B)}$ 125 may continually be commanded to initiate movements inward and outward to maintain the position of the load, as needed, to a position of load stability until the load come to a state of rest again.

This new configuration would provide an energy-efficient means for Vertical yawing stabilization.

FIG. 3E combining the embodiments from FIG. 3B and FIG. 3D, depicts a magnet configuration in which the functions of generating the Stabilizer magnetic fields of force and producing Vertical Stability are separate from the levitation and propulsion systems; giving the advantage of being able to tailor and control these functions optimally for the application at hand.

These repelling magnetic fields of forces produce stabilized control on high-speed objects such as a train, or any load within the weight limits of the magnetic fields of force. This mode of transportation eliminates power from the grid or from any external source. The power required to overcome aerodynamic drag at initial momentum, Propulsion and Drive at continuous high speeds is in the encountering magnetic fields of force.

Major advantages of the present configuration are its low cost of construction, low noise at operation and the magnetic fields of force is obtained without currents, and the list goes on. The force is determined by the remnant field of the magnets. The Load-to-Drag (L/D) ratio at initial rest position and at operating loads remains constant throughout initial momentum of load until load returns to rest. An additional advantage for some applications is that the new configuration provides a continuous force for either upward or downward displacements of the Halbach arrays from the centered position, and thus can counteract aerodynamic loads, should they result in Propulsion and Drive forces, such as in rocket launcher applications and satellite deployment.

Particularly for lower-speed applications of magnetic levitation, such as to urban train systems, it is desirable to employ systems that are simple in construction and operation and that have low drag and low noise at urban speeds. Conventional maglev systems, that is, ones employing superconducting coils, or ones requiring servo-controlled electromagnets for levitation, propulsion and Drive, appear to fall short on one or more of these counts. The present invention, an evolutionary breakthrough development of the Magnetic Acceleration (MagAcc) system, aims to provide a solution to this problem.

FIG. 4A is a schematic representing the full layout of the new Magnetic Acceleration (MagAcc) Load Support System. FIG. 4B depicts the Frontal view of the outer magnetic fields of force and FIG. 4C depicts the Frontal view of the MagAcc Load Support System and the outer magnetic fields of force interacting, according to the present embodiment.

The $JURLYN_{Main-1}$ 401 is the main servo-control operating system for the MagAcc. The $JURLYN's_{Main-1}$ levitation 410, lateral stabilization 420, and vertical stabilization systems 430 function independently, but, synchronous with all the other phases. There are approximately fourteen (14) magnetic fields of force tracts entwined in one MagAcc Load Support System configuration.

The $JURLYN_{1a}$ 402 and the $JURLYN_{1b}$ 403 operate independently of each other but, synchronous for stability on the load. Both the $JURLYN_{1a}$ 402 and the $JURLYN_{1b}$ 403 control all command sequences delivered from the $JURLYN_{Main-1}$ 401 to the lateral stabilization 420 and vertical stabilization systems 430.

The $JURLYN_{Main-1}$ 401 controls the MagAcc levitation systems 410. The levitation system 410 mounts on both sides of the $JURLYN_{Main-1}$ 401 for midsection magnetic field balance and for midpoint reinforcement.

The $JURLYN_{Main-1}$ 401 controls the MagAcc lateral stabilization systems 420. The lateral stabilization systems 420 mount on both sides of the $JURLYN_{1a}$ 402 and the $JURLYN_{1b}$ 403. They function together to stabilize lateral movement on the load and maintain magnetic centering for their respective JURLYN 402 403.

The $JURLYN_{Main-1}$ 401 controls the MagAcc vertical stabilization systems 430. The vertical stabilization systems 430 mount on both sides of the $JURLYN_{1a}$ 402 and the $JURLYN_{1b}$ 403. They function together to stabilize vertical movement on the load and maintain magnetic centering for their respective JURLYN 402 403.

The $JURLYN_{Main-1}$ 401 controls the vertical stabilization systems 430 and levitation systems 410 for MagAcc braking. The levitation systems 410 and vertical stabilization systems 430 mount on both sides of the $JURLYN_{Main-1}$ 401, the $JURLYN_{1a}$ 402 and the $JURLYN_{1b}$ 403, respectively. They function together to couple a stable deceleration and braking on the load and maintain a magnetic stable braking midpoint for the load. Uniformly, the levitation systems 410 and vertical stabilization systems 430 are given command sequences to shift left and right, thereby, causing the loads magnetic fields of force emanating from the levitation systems 410 and vertical stabilization systems 430 to be out of sync with the magnetic fields of force of their respective LTD and thereby, changing the repel mode into an attract mode and causing a braking sensation to occur.

Connecting the JURLYN 401 402 403, levitation 410, lateral stabilization 420, and vertical stabilization 430 systems are interleaved conduits carrying one or more command lines, symmetrically located with respect from their respective JURLYN servo-control system 401 402 403. Each conduit of this interleaved array, at a given axial location, carries the command, in the same direction, alternating in time, in synchronism with the motion of the object so as to provide continuous undulation for load lift, load stabilization, load propulsion and driving/braking forces as needed.

The new magnetic fields of force configuration would provide an energy-efficient means stabilized transportation of a load. It is environmentally friendly, and thereby, making its pollution level minute. The near frictionless magnetic fields of force for lateral and levitation movement lessen the noise reduction and make this the ideal mode for urban transportation. The overall cost for production to operation is lesser than any in its field and to maintain its operation is the most cost efficient ever introduced.

This magnet configuration is provided in which the functions of the generation of the levitating magnetic fields of force and of their use to produce levitation are separated, with the advantage of being able to tailor and control these functions optimally for the application at hand.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the above claims.

The invention claimed is:

1. A magnet configuration comprising:
   a first Halbach array having a first magnetic field; and
   a second Halbach array having a second magnetic field, wherein said first Halbach array and said second Halbach array are magnetically and structurally connected together to form a first pair of magnetic fields of flux having characteristics of attraction and repulsion between the connections of the Halbach arrays with the attraction polarities being the drop edges on all sides of their adjoining repulsion polarities, and
   one or more pressure pumps connected to the first Halbach array wherein the pressure pump are configured to be adjusted in length to adjust the distance between the first and second Halbach arrays.

2. The magnet configuration of claim 1; wherein the first and second Halbach array are arranged in a nine by one magnet formation to produce three magnetic fields of attract and two magnetic fields of repel.

3. The magnet configuration of claim 2; wherein the first and second Halbach array have two magnet poles pointing towards the mid-plane between the arrays, three magnet poles pointing away from the mid-plane between the arrays and four magnet poles pointing toward the center pole of their respective array.

4. A system incorporating an interleaved array of one or more Halbach array configurations according to claim 1, wherein the system provides a centering force from one or more pairs of Halbach arrays wherein the system is symmetrically located with respect to the midplane of the said one or more pairs of Halbach arrays, wherein each midplane of said centering force, at a given axial location, carries the same magnetic field of force in the same direction with the motion of the object.

5. A system incorporating an interleaved array of one or more Halbach array configurations according to claim 1, comprising a Joined Undulate Right/Left/Yawing Navigation (JURLYN) servo-control system wherein the control system sends and receives commands to and from one or more structures by one or more conduits carrying one or more command lines wherein the structure receive the commands and adjust accordingly to said commands.

6. A system incorporating an interleaved array of one or more Halbach array configurations according to claim 1, wherein multiple first and second Halbach array are fixedly arranged immediately adjacent to each other so as to define a rectangular matrix having rows and columns.

7. A system incorporating an interleaved array of one or more Halbach array configurations according to claim 6, wherein the system provides a centering force from one or more pairs of Halbach arrays wherein the system is symmetrically located with respect to the midplane of the said one or more pairs of Halbach arrays, wherein each midplane of said centering force, at a given axial location, carries the same magnetic field of force in the same direction with the motion of the object.

8. A system incorporating an interleaved array of one or more Halbach array configurations according to claim 6, comprising one or more pressure pumps connected to the first Halbach array wherein the pressure pump are configured to be adjusted in length to adjust the distance between the first and second Halbach arrays.

9. A system incorporating an interleaved array of one or more Halbach array configurations according to claim 6, comprising a Joined Undulate Right/Left/Yawing Navigation (JURLYN) servo-control system wherein the control system sends and receives commands to and from one or more structures by one or more conduits carrying one or more command lines wherein the structure receive the commands and adjust accordingly to said commands.

10. A magnet configuration comprising:
    a first London Assemblage having a first magnetic field; and
    a second London Assemblage having a second magnetic field, wherein said first London Assemblage and said second London Assemblage are magnetically and structurally connected together to form a single magnetic fields of flux having characteristics of repulsion between the connections of the London Assemblages wherein the repulsion polarities are without drop edges on all sides of their adjoining repulsion polarities.

11. The magnet configuration of claim 10; wherein the first and second London Assemblage are arranged in a nine by one magnet formation to produce three magnetic fields of repulsion.

12. The magnet configuration of claim 11; wherein the first and second London Assemblage have three magnet poles pointing towards the mid-plane between the arrays and six magnet poles pointing toward the center pole of their respective array.

13. A system incorporating an interleaved array of one or more London Assemblage configurations according to claim 10, wherein the system provides a centering force from one or more pairs of London Assemblage wherein the system is symmetrically located with respect to the midplane of the said one or more pairs of London Assemblages, wherein each midplane of said centering force, at a given axial location, carries the same magnetic field of force in the same direction with the motion of the object.

14. A system incorporating an interleaved array of one or more London Assemblage configurations according to claim 10, comprising one or more pressure pumps connected to the first London Assemblage wherein the pressure pump are configured to be adjusted in length to adjust the distance between the first and second London Assemblages.

15. A system incorporating an interleaved array of one or more London Assemblage configurations according to claim 10, comprising a Joined Undulate Right/Left/Yawing Navigation (JURLYN) servo-control system wherein the control system sends and receives commands to and from one or more structures by one or more conduits carrying one or more command lines wherein the structure receive the commands and adjust accordingly to said commands.

16. A plurality of magnet configurations wherein the magnet configuration comprises; a first London Assemblage having a first magnetic field and a second London Assemblage having a second magnetic field, wherein said first London Assemblage and said second London Assemblage are magnetically and structurally connected together to form a first pair of magnetic fields of flux having characteristics of repulsion between the connections of the London Assemblage without drop edges on the sides; wherein multiple first and second London Assemblage are fixedly arranged immediately adjacent to each other so as to define a rectangular matrix having rows and columns.

17. A system incorporating an interleaved array of one or more London Assemblage configurations according to claim 16, wherein the system provides a centering force from one or more pairs of London Assemblages wherein the system is symmetrically located with respect to the midplane of the said one or more pairs of London Assemblages, wherein each midplane of said centering force, at a given axial location, carries the same magnetic field of force in the same direction with the motion of the object.

18. A system incorporating an interleaved array of one or more London Assemblage configurations according to claim 16, comprising one or more pressure pumps connected to the first London Assemblage wherein the pressure pump are configured to be adjusted in length to adjust the distance between the first and second London Assemblages.

19. A system incorporating an interleaved array of one or more London Assemblage configurations according to claim 16, comprising a Joined Undulate Right/Left/Yawing Navigation (JURLYN) servo-control system wherein the control system sends and receives commands to and from one or more structures by one or more conduits carrying one or more command lines wherein the structure receive the commands and adjust accordingly to said commands.

* * * * *